United States Patent
Helferich et al.

(10) Patent No.: US 12,542,019 B2
(45) Date of Patent: Feb. 3, 2026

(54) METHOD AND APPARATUS FOR GRANTING ACCESS TO COMPARTMENTS OF A COMPARTMENT INSTALLATION

(71) Applicants: Frank Helferich, Leubsdorf (DE); Klaus Kiehne, Bonn (DE)

(72) Inventors: Frank Helferich, Leubsdorf (DE); Klaus Kiehne, Bonn (DE)

(73) Assignee: Deutsche Post AG, Bonn (DE)

( * ) Notice: Subject to any disclaimer, the term of this patent is extended or adjusted under 35 U.S.C. 154(b) by 246 days.

(21) Appl. No.: 17/722,489

(22) Filed: Apr. 18, 2022

(65) Prior Publication Data

US 2022/0343708 A1 Oct. 27, 2022

(30) Foreign Application Priority Data

Apr. 22, 2021 (DE) ............ 10 2021 110 313.4

(51) Int. Cl.
    G07C 9/00     (2020.01)
    H04L 9/08     (2006.01)
    H04L 9/32     (2006.01)

(52) U.S. Cl.
    CPC ........ G07C 9/00912 (2013.01); H04L 9/0861 (2013.01); H04L 9/32 (2013.01)

(58) Field of Classification Search
    CPC ............ G07C 9/00912; G07C 9/00896; H04L 9/0861; H04L 9/32; H04L 63/0428; G06Q 10/0836; G06Q 20/3829; G06F 21/602
    See application file for complete search history.

(56) References Cited

U.S. PATENT DOCUMENTS

| | | | |
|---|---|---|---|
| 9,600,949 B2 * | 3/2017 | Conrad | ............... H04W 12/06 |
| 2015/0143123 A1 | 5/2015 | Bergqvist | |
| 2016/0035163 A1 | 2/2016 | Conrad et al. | |
| 2016/0036594 A1 * | 2/2016 | Conrad | .................. G06F 21/35 |
| | | | 713/185 |
| 2022/0014388 A1 * | 1/2022 | Klink | ................. H04W 12/069 |

FOREIGN PATENT DOCUMENTS

| | | |
|---|---|---|
| CN | 105096086 A | 11/2015 |
| CN | 108171896 A | 6/2018 |
| CN | 108986261 A | 12/2018 |

(Continued)

*Primary Examiner* — Vernal U Brown

(74) *Attorney, Agent, or Firm* — Reinhart Boerner Van Deuren P.C.

(57) ABSTRACT

Disclosed is a method in which a key is acquired; access information is generated; and the access information is encrypted with the key. Further, an indicator is associated with the access information and first data is output. The first data includes the access information encrypted with the key and the indicator. Third data is acquired from an apparatus having a key for decrypting the encrypted access information, and the third data includes a code word and an indicator. Access information is determined from the third data, and it is ascertained whether the code word authorizes access. Access is granted to a compartment installation if it was ascertained that the code word authorizes access. Two associated methods, one performed by a mobile apparatus, and another performed by a system are disclosed. Furthermore, corresponding apparatuses, systems, and computer programs are disclosed.

21 Claims, 8 Drawing Sheets

(56) References Cited

FOREIGN PATENT DOCUMENTS

| | | |
|---|---|---|
| CN | 112216038 A | 1/2021 |
| EP | 2 026 290 A1 | 2/2009 |
| KR | 101054258 B1 | 8/2011 |
| KR | 20190136554 A | 12/2019 |
| WO | WO 2009/018995 A1 | 2/2009 |

\* cited by examiner

METHOD AND APPARATUS FOR GRANTING ACCESS TO COMPARTMENTS OF A COMPARTMENT INSTALLATION

CROSS-REFERENCE TO RELATED PATENT APPLICATIONS

This patent application claims priority to German Patent Application No. 10 2021 110 313.4, filed Apr. 22, 2021, the entire teachings and disclosures of which are incorporated herein by reference thereto.

FIELD

Exemplary embodiments of the invention relate to methods, apparatuses, systems and computer programs for granting access to a compartment installation or to one or more compartments of the compartment installation, wherein a necessary condition for granting access is that it was ascertained that a recipient is authorized to acquire access to one or more compartments of the compartment installation, wherein the compartment installation is in particular a compartment installation for delivery or carrier services to collect and/or introduce shipments.

BACKGROUND

Compartment installations are used diversely in the form of lockbox or parcel compartment installations, for example. One example of a parcel compartment installation is the applicant's package station, to which a recipient may have shipments delivered. The deliverer places the shipment into a compartment of a package station situated in proximity to the recipient and/or previously defined by the recipient, the compartment is locked and the recipient is notified accordingly. In order that the notified recipient may remove a shipment provided for him/her from a compartment of the compartment installation, the compartment installation must ascertain that the recipient is authorized to acquire access to one or more compartments of the compartment installation.

In one realization of the applicant's package station mentioned above, the recipient, when verifying the authorization for access to one compartment or a plurality of compartments, must input a user identifier, also called post number, permanently assigned to the recipient functionally as a customer number and, in addition, a temporarily valid collection code into an input device, for example a numeric keypad, of the package station. The temporarily valid collection code, known as mTAN (mobile transaction number) from the applicant's realization mentioned, has previously been communicated electronically to the person together with the notification that one or more shipments are ready for the person to collect in the designated package station. In this case, a post number of a user, insofar as one or more shipments are ready for the user to collect in one package station or a plurality of package stations, is assigned only one collection code for all the shipments. Said collection code retains its validity as long as there is at least one shipment which has not yet been collected.

The respective pieces of access authorization information of users registered to use the package station, that is to say the user identifiers and the collection codes or post numbers and mTANs, are managed and stored by a system, for example a backend system or a server. The package stations functioning as compartment installations are coupled to the system via long-range data communication connections, for example via LAN (Local Area Network) interfaces, for exchanging data required for the access authorization check.

BRIEF SUMMARY

With regard to a compartment installation it is desirable, in principle, that said compartment installation may reliably, efficiently and securely ascertain that a recipient is authorized to acquire access to one or more compartments of the compartment installation, in order subsequently to grant access to the corresponding compartments.

Regarding security, it is particularly relevant here that unauthorized access to compartments of the compartment installation is prevented.

Regarding efficiency, it is particularly relevant that data have to be captured and/or processed as little as possible.

Regarding reliability, it is desirable that the compartment installation functions for example independently of whether a connection of the compartment installation to a system, for example comprising one or more servers, is permanently present and whether, at the time at which a user would like to verify his/her authorization for access to one compartment or a plurality of compartments, said user may acquire pieces of information from the system and/or exchange pieces of information with the system.

In the case of the applicant's package station concept presented in the introduction, a compartment installation, on the basis of a user identifier and a collection code, ascertains whether access to one or more compartments may be granted to a user. In this case, the user identifier is a six- to twelve-digit number which is permanently assigned to the user and therefore hardly secret, and the collection code is a code which is formed only by a few digits and which was electronically communicated to the user in the event of one or more shipments intended for said user having been inserted into the package station.

As described in the introduction, both the user identifier and the collection code are stored jointly on a system, for example a backend system. An attacker who gains access to the system in an unauthorized manner thus disadvantageously acquires access to all pieces of information that the attacker requires to acquire access to one or more compartments of one or more compartment installations. The attacker thus for example also acquires access to the shipments respectively introduced there.

Furthermore, on the one hand, it is indeed advantageous that the collection code comprises only a few digits. When capturing the collection code, the compartment installation then need only capture and process a few digits. Equally, it is also advantageous that a user identifier is assigned only one collection code for collection of all the shipments, since then the compartment installation does not have to capture and process one collection code for each shipment.

On the other hand, it is disadvantageous that the collection code comprises only a few digits, since said collection code may then be determined more easily by an attacker, for example by means of a brute force attack. In this case, the risk of a successful brute force attack is disadvantageously increased by the fact that a user identifier is assigned only one collection code for collection of all the shipments, with the result that an attacker needs to find out only one collection code in order to acquire access to a plurality of compartments and thus a plurality of shipments. In particular, the attacker has time to do this until all the shipments of a user have been collected.

The problem addressed by the present invention is that of overcoming one or more of the disadvantages described above and/or obtaining one or more of the advantages described above and/or achieving one or more of the sought improvements described above.

In accordance with a first exemplary aspect of the invention, a method is disclosed which is performed for example by a compartment installation or a system comprising a compartment installation, the method comprising: acquiring a key; generating access information; encrypting the access information with the key; associating an indicator with the access information; outputting first data, wherein the first data comprise at least the access information encrypted with the key and the indicator; acquiring or capturing third data from an apparatus having the key for decrypting the encrypted access information, wherein the third data comprise a code word and an indicator; determining access information on the basis of at least the indicator contained in the third data; ascertaining, on the basis of at least the determined access information, whether the code word authorizes access to the compartment installation or to one or more compartments of the compartment installation; and granting access to the compartment installation or to one or more compartments of the compartment installation, wherein a necessary condition for granting access is that it was ascertained that the code word authorizes access to the compartment installation or access to the one or more compartments of the compartment installation.

In accordance with a second exemplary aspect of the invention, a method is disclosed which is performed for example by a mobile apparatus, the method comprising: generating or acquiring at least one key; communicating the key to an apparatus or to a system which is configured to communicate the key to a compartment installation; acquiring second data, wherein the second data comprise at least access information encrypted with the key and an indicator; decrypting the access information encrypted with the key; generating a code word on the basis of at least the access information; and communicating third data to a compartment installation or providing third data for a compartment installation in order to acquire access to the compartment installation or to one or more compartments of the compartment installation, wherein the third data comprise at least the code word and the indicator.

In accordance with a third exemplary aspect of the invention, a method is disclosed which is performed for example by an apparatus or a system, the method comprising: acquiring, for example from a mobile apparatus, or generating a key; communicating the key to a compartment installation; acquiring first data from the compartment installation, wherein the first data comprise at least access information encrypted with the key and an indicator; and outputting second data, for example to the mobile apparatus, wherein the second data comprise at least the access information encrypted with the key and the indicator.

In accordance with each of these aspects of the invention, the following are furthermore disclosed in each case:

A computer program, comprising program instructions which cause a processor to perform and/or control the method in accordance with the respective aspect of the invention when the computer program runs on the processor. In this specification, a processor should be understood to mean, inter alia, control units, microprocessors, microcontrol units such as microcontrollers, digital signal processors (DSP), application-specific integrated circuits (ASICs) or field programmable gate arrays (FPGAs). Here either all the steps of the method may be controlled, or all the steps of the method may be performed, or one or more steps may be controlled and one or more steps may be performed. The computer program may be distributable for example via a network such as the Internet, a telephone or mobile radio network and/or a local network. The computer program may be at least partly software and/or firmware of a processor. It may equally be implemented at least partly as hardware. The computer program may be stored for example on a computer-readable storage medium, e.g. a magnetic, electrical, optical and/or other type of storage medium. The storage medium may be for example part of the processor, for example a (nonvolatile or volatile) program memory of the processor or a part thereof. The storage medium may be for example a substantive or physical storage medium.

An apparatus or a system composed of at least two apparatuses, configured for performing and/or controlling the method in accordance with the respective aspect of the invention or comprising respective means for performing and/or controlling the steps of the method in accordance with the respective aspect of the invention. Here either all the steps of the method may be controlled, or all the steps of the method may be performed, or one or more steps may be controlled and one or more steps may be performed. One or more of the means may also be implemented and/or controlled by the same unit. By way of example, one or more of the means may be formed by one or more processors. An apparatus in accordance with the first aspect of the invention might be for example a compartment installation. An apparatus in accordance with the second aspect of the invention might be for example a mobile apparatus, e.g. a smartphone or a device of a deliverer. A system in accordance with the third aspect of the invention might comprise for example at least one or two servers.

An apparatus comprising at least one processor and at least one memory that includes program code, wherein the memory and the program code are configured to cause an apparatus having the at least one processor to perform and/or control at least the method in accordance with the respective aspect of the invention. Here either all the steps of the method may be controlled, or all the steps of the method may be performed, or one or more steps may be controlled and one or more steps may be performed.

These exemplary aspects of the present invention may have inter alia the properties described below.

The compartment installation comprises a plurality of compartments (that is to say for example more than one compartment or more than two compartments). The compartments are configured for example to receive shipments (e.g. letters, parcels, packages), deliveries (e.g. washed laundry or laundry to be washed, meals from delivery services (e.g. a pizza or sushi service), etc.) or items (e.g. valuables, luggage, etc.). The compartments are each lockable, for example by means of a respective door or shutter. By way of example, the compartments are substantially parallelepipedal receiving containers provided with doors or shutters on one or more sides. By way of example, multiple compartments in the compartment installation are arranged one above another and/or next to one another. By way of example, the compartment installation may consist of one or more modules arranged next to one another, with one or more compartments in each module being arranged one above another. The respective doors of the compartments are then fixed on laterally, for example, and may be opened forward, for example. The compartments of the compartment installation may all have the same size. Alternatively, at least some compartments of the compartment installation may have different sizes. The compartment installation may have for example compartments for letters (letter compartments) and/or compartments for parcels (parcel compartments). The letter compartments each have the same size within the compartment installation, for example, but two or more different sizes are also possible. The parcel compartments may be represented by just one identical size or by different sizes in the compartment installation. The compartment installation may be configured for example as a parcel compartment installation or a combined letter and parcel compartment installation.

Each of the compartments is provided with a respective lock, for example, in order to be able to control access to the individual compartments of the compartment installation by users. By way of example, the lock of a compartment may be arranged in or on the compartment, for example on a door (e.g. also in the form of a shutter) of the compartment. If the lock is not arranged on the door (that is to say is arranged on a lateral wall of the compartment, for example), it interacts with the door, for example, by virtue of a bolt being introduced into an opening in the door and pulled out again, for example. The lock of a compartment may return to a locked position as standard, for example, and then be actuable only for unlocking purposes, for example. After the lock has been unlocked, it is then possible for the door of the compartment to be opened, for example. Since the lock automatically returns to the locked position, locking of the compartment may be achieved by closing the door, for example by virtue of a catch function of the lock being utilized when closing the door.

A compartment of the compartment installation may be either open or closed. In the open state of the compartment, the lock of the compartment is unlocked. The door of the compartment may then be opened by a person without force being applied, for example, or stands open. In the closed state of the compartment, by contrast, the lock of the compartment is locked. The door of the compartment may then no longer be opened by a person who is not authorized for opening without force being applied, for example.

The lock of a respective compartment is controllable, for example, in particular in electronic form. In particular, at least the process of locking and/or unlocking of the lock may be controlled. The lock of a compartment may be controlled by a lock control unit, for example, wherein either each lock is assigned a dedicated lock control unit, or a (for example central) lock control unit controls some (e.g. those of a module of the compartment installation) or all locks of the compartment installation. In the former case, a plurality of lock control units, for example all lock control units or those of one or more modules of the compartment installation, are controlled for example by a superordinate control unit, while in the latter case, for example, there is a respective wiring between the lock control unit and each of the locks controlled thereby, wherein voltages applied or signals transmitted via a respective wiring are then assigned only in each case to the lock to which the wiring leads, but not to other locks. Alternatively, it is also conceivable to use a bus to which both the lock control unit and a plurality of locks are electrically linked. A unit for evaluating the control signals acquired via the bus is then required in each lock, however, which makes the locks more complex and thus more expensive than in the case of direct wiring.

A lock control unit (in particular the central lock control unit) may for example not only handle the actuation of the lock or locks but also ascertain whether acquired or captured data authorize access to one compartment or a plurality of compartments of the compartment installation, and accordingly grant access to the compartment or compartments (e.g. by unlocking the door of the compartment or the doors of the compartments) or deny access (e.g. by virtue of the door of the compartment or the doors of the compartments not being unlocked).

In order that a compartment installation and/or a unit associated therewith, e.g. a lock control unit, and/or a system comprising a compartment installation may ascertain whether a code word authorizes access to one compartment or a plurality of compartments of the compartment installation, and, if that is the case, may grant access, for example the compartment installation or a system comprising the compartment installation performs the steps of the method in accordance with the first exemplary aspect of the invention. Hereinafter there is frequent description of the fact that a compartment installation performs one or more steps of the method in accordance with the first aspect of the invention. Although it is an embodiment of the method in accordance with the first aspect of the invention that the compartment installation performs all the steps of method in accordance with the first aspect of the invention, the description of these steps is expressly intended also to be understood in each case such that the respective step or a part thereof may also be performed by another apparatus which for example is part of a system comprising the compartment installation.

The method in accordance with the second exemplary aspect of the invention is performed for example by a mobile apparatus, for example a smartphone and/or a device of a deliverer. The method in accordance with the third aspect of the invention is performed for example by an apparatus, e.g. a server, or a system, e.g. comprising two servers, which may communicate with one another, for example. In this case, the apparatus or the system which performs the method in accordance with the third aspect of the invention may be for example a backend system or a backend server. However, it may also be the device of a deliverer or a system comprising the device of a deliverer.

The method in accordance with the second exemplary aspect of the invention comprises generating or acquiring at least one key. The key may be for example a key for symmetric encryption and decryption. Alternatively, the key may be for example a public key or a private key of an asymmetric key pair. If the key is for example the public key of an asymmetric key pair, the generating or acquiring may for example also relate to the public key and the private key of the asymmetric key pair. The key may have a predetermined length, for example shorter than 128 bits, 128 bits, 160 bits, 256 bits, 512 bits, 1024 bits, 2048 bits, 4096 bits or longer than 4096 bits, or may have an arbitrary length between or below or above the values mentioned. The key may contain for example random values and/or a user identifier and/or a time stamp and/or a version number of the authentication method and/or a checksum. The key may be generated for example by the apparatus that performs the method in accordance with the second exemplary aspect of the invention. The key is then for example initially not known and/or accessible to any other apparatus. Alternatively, the key may also be acquired, for example from another apparatus that has generated the key, or for example by the key being acquired by means of a user's input on an input unit—suitable for this purpose—of the apparatus that performs the method in accordance with the second exemplary aspect of the invention, for example a touch-sensitive screen. The apparatus that performs the method in accordance with the second exemplary aspect of the invention then need not implement the outlay and complexity associated with generating the key, for example.

The method in accordance with the second exemplary aspect of the invention furthermore comprises communicating the key to an apparatus or to a system which is configured to communicate the key to a compartment installation. The apparatus or the system to which the key is communicated may perform the method in accordance with the second and/or the third exemplary aspect of the invention, for example. This may be for example a server, a system of servers, a system comprising a compartment installation, a compartment installation, a smartphone or a device of a deliverer.

In this case, the communicating and the associated acquiring of a key may be performed for example via a wireless and/or wired communication interface of the apparatus that performs the method in accordance with the second and/or third exemplary aspect of the invention, for example via the Internet and/or via a local radio connection such as e.g. Bluetooth or NFC. The key may be communicated for example by means of one or more messages and/or by means of one or more packets, for example Internet Protocol (IP) v4 or IPv6 or Bluetooth packets. In this case, for example, further data and/or information may also be communicated with the key.

The method in accordance with the third exemplary aspect of the invention comprises acquiring or generating a key. If the key is acquired, it may be acquired from a mobile apparatus, for example. In particular, the key may be acquired from a mobile apparatus that performs the method in accordance with the second aspect of the invention. Additionally or alternatively, however, the key may also be acquired from some other apparatus, for example a server. The key may for example be the key from the method in accordance with the second exemplary aspect of the invention or at least have properties which have been described for the key from the method in accordance with the second exemplary aspect of the invention. The key is communicated and/or acquired for example by means of one of the kinds of transmission that have been described for communicating the key in the method in accordance with the second exemplary aspect of the invention.

The method in accordance with the third exemplary aspect of the invention furthermore comprises communicating the key to a compartment installation. The compartment installation is for example the compartment installation which performs the method in accordance with the first exemplary aspect of the invention, or is contained in a system which performs the method in accordance with the first exemplary aspect of the invention. The communicating is performed for example by means of one of the kinds of transmission that have been described for communicating the key in the method in accordance with the second exemplary aspect of the invention. In this case, the communicating may also be performed indirectly, that is to say for example via a device configured for forwarding data, e.g. the device of a deliverer, which e.g. forwards the key and possibly temporarily stores it beforehand.

The method in accordance with the first exemplary aspect of the invention comprises acquiring a key. The key may be for example the key from the method in accordance with the second and/or third exemplary aspect of the invention or at least have properties that have been described for the key from the method in accordance with the second and/or third exemplary aspect of the invention. The acquiring is performed for example via a communication interface with the Internet. By way of example, the key may be acquired from a system or an apparatus which performs the method in accordance with the third aspect of the invention. In some embodiments the key may also be acquired differently, however. By way of example, the key may be acquired from a device configured for forwarding data. Such a device may be for example the device of a deliverer. For this purpose, for example, the device of the deliverer may have stored the key, for example by virtue of the device of the deliverer daily synchronizing data with an apparatus that has the key, e.g. a server, acquiring the key in the process and then storing it. In other embodiments, the device of the deliverer, for example at a time at which it is situated in proximity to the compartment installation, may establish a connection to a system or an apparatus which has the key, in order to acquire the key therefrom and forward it to the compartment installation. The compartment installation may then acquire the key from the device for example via a radio connection, e.g. Bluetooth, Near Field Communication (NFC), Wireless Local Area Network (WLAN). Alternatively, however, the key may also be acquired from some other device, for example from a device of a user of the compartment installation, for example via a radio connection. The device of the user of the compartment installation may likewise merely be utilized for forwarding, or else the device of the user may have generated the key.

The method in accordance with the first exemplary aspect of the invention furthermore comprises generating access information. The access information may for example be suitable for enabling, on the basis of at least said access information, a code word which authorizes access to the compartment installation or to one or more compartments of the compartment installation to be generated. The access information may be a random value, for example, and may have for example a specific length, for example 8 bits, 16 bits, 128 bits, 256 bits, 1024 bits, 4096 bits or more than 4096 bits, or an arbitrary length between, below or above the values mentioned. Alternatively or additionally, the access information or a part of the access information may be a pattern or follow a predetermined rule. The access information may be generated wholly or partly following a predetermined rule, pseudo-randomly and/or randomly. After being generated, the access information may be for example difficult and/or complicated to guess, to generate anew or to determine in some other way, in particular by persons or other devices or apparatuses.

The method in accordance with the first exemplary aspect of the invention furthermore comprises encrypting the access information with the key. The method by which the access information is encrypted with the key may depend for example on a time, a date, a setting of the apparatus performing the encryption, the access information and/or the key. Alternatively, the same method may always be used. By way of example, a symmetric encryption method may be used for encrypting the access information or a part of the access information. By way of example, the key is then a symmetric key. Data Encryption Standard (DES), Triple-DES, Advanced Encryption Standard (AES), International Data Encryption Algorithm (IDEA), Blowfish or Twofish are examples of symmetric encryption methods. Alternatively or additionally, an asymmetric encryption method may be used for encrypting the access information or a part of the access information. By way of example, the key is then a key of an asymmetric key pair. Such an asymmetric encryption method may be for example the Rivest, Shamir, Adleman (RSA), Elgamal, or the elliptical curve method. One advantage of a symmetric encryption method over an asymmetric encryption method is that it is faster. However, in the case of an asymmetric encryption method it is not possible for the encrypted data to be decrypted again with the key used, rather a second key of an asymmetric key pair is required.

The method in accordance with the first exemplary aspect of the invention furthermore comprises associating an indicator with the access information. The indicator may comprise for example a numerical value, a time value, a word, and/or a mixture of numbers and letters, and may be represented for example as bits or bytes. The indicator may for example be generated randomly or be selected from a predefined set of possible values. The selection may then be random, for example. Alternatively, the indicator may for example be generated according to a predetermined rule or be selected from a predefined set of possible values according to a predetermined rule.

The indicator may be associated with the access information for example by means of a data structure, for example a table containing one or more indicators in one column and respective associated pieces of access information in a further column. Alternatively or additionally, for example, pieces of access information may be present in a list and/or an array and the indicator may for example indicate or make determinable the position of the access information associated with it in the list and/or the array. The association may for example also be averageable, that is to say in particular more than a simple assignment, for example an assignment over a plurality of assignment levels. In this regard, the access information may be associated for example with at least one compartment of the compartment installation, for example by virtue of the access information having been or being assigned to a compartment of the compartment installation, e.g. by a compartment installation. By way of example, access information is assigned to each compartment of a compartment installation in which a shipment is situated. By way of example, in each case exactly one piece of access information is then assigned to these compartments. The indicator may then be associated for example with the compartment, for example by way of a table or by means of a list or an array. Associating the indicator with the access information may for example merely be associating the indicator with the compartment if the compartment is already associated with access information, for example assigned thereto. Conversely, associating the indicator may for example merely include associating the access information with the compartment. This is because in one of the two cases the indicator is already associated with access information.

The method in accordance with the first exemplary aspect of the invention furthermore comprises outputting first data, wherein the first data comprise at least the access information encrypted with the key and the indicator. Data may for example be bits or bytes or be represented as such and the access information encrypted with the key and the indicator may for example be present or be represented in each case as bits or bytes and/or be comprised by the first data in this way. The indicator may for example be comprised by the first data without having been encrypted with the key. Alternatively or additionally, the indicator may be comprised by the first data at least partly after having been encrypted with the key. Furthermore, the access information and/or the indicator and/or parts of the first data may be present after having been encrypted and/or transformed in some other way, for example.

Data may in principle be output for example on a screen and/or in a manner printed on paper, for example as letters and/or numbers and/or as an optical pattern, e.g. as a barcode or QR code. In principle, however, data may also alternatively or additionally be output as part of one or more messages, for example of one or more packets of a communication protocol, for example 3G, 4G, Bluetooth, Ethernet, or NFC. Data may thus be output to some other apparatus for example via the Internet and/or some other network. In this case, for example, the access information and the indicator may also be output, communicated, received, acquired and/or captured or handled in some other way in each case partly or wholly in the same message and/or in the same packet or in different messages and/or packets. The first data may for example be output to an apparatus or a system which for example controls and/or performs the method in accordance with the second and/or third aspect of the invention or is configured to perform the respective method. By virtue of at least the access information contained in the first data being encrypted with the key, at least the access information is protected for example against being spied out by unauthorized persons who cannot or at least in practice cannot decrypt the access information encrypted with the key.

The method in accordance with the third exemplary aspect of the invention comprises acquiring first data from the compartment installation, wherein the first data comprise at least access information encrypted with the key and an indicator. The first data may be in particular the first data that are output in the method in accordance with the first exemplary aspect of the invention. The first data may thus be acquired using one of the kinds of communication that have been described for outputting first data in relation to the method in accordance with the first exemplary aspect of the invention.

When acquiring first data, that is to say for example at this time, but possibly also before and/or after that, it is not possible for example for the apparatus or the system which performs the method in accordance with the third exemplary aspect of the invention to decrypt the access information encrypted with the key. This is the case, for example, because the apparatus or the system does not have or no longer has stored a key with which the access information encrypted with the key might be decrypted. The fact that the apparatus or the system which performs the method in accordance with the third exemplary aspect of the invention is possibly not able to decrypt the access information encrypted with the key because it does not know or no longer knows the key for decrypting, for example, increases for example the security of the methods, apparatuses and/or systems according to the invention. Specifically, the key for decrypting then cannot be spied out by the apparatus and/or the system which performs the method in accordance with the third aspect of the invention. This is particularly advantageous if the apparatus or the system is or comprises e.g. a server and manages e.g. a plurality of compartment installations which perform the method in accordance with the first exemplary aspect of the invention and/or mobile apparatuses which perform the method in accordance with the second exemplary aspect of the invention. In such a case, an attacker might otherwise spy out for example a plurality of keys and/or pieces of access information concerning respective compartments and/or compartment installations from the apparatus or the system which performs the method in accordance with the third exemplary aspect of the invention, if said attacker obtained access to the apparatus or the system.

The method in accordance with the third exemplary aspect of the invention furthermore comprises outputting second data, for example to the mobile apparatus, wherein the second data comprise at least the access information encrypted with the key and the indicator. The apparatus or the system which performs the method in accordance with the third exemplary aspect of the invention may for example ascertain which portion of the first and/or second data constitutes the access information encrypted with the key and/or the indicator. Alternatively, this may be unknown to the apparatus or the system and/or impossible for the apparatus or the system to find out. The mobile apparatus to which the second data may be output (or communicated) may perform for example the method in accordance with the second exemplary aspect of the invention. The mobile apparatus may be for example a smartphone of a user or a device of a deliverer and the apparatus or the system which outputs the second data to the mobile apparatus may for example identify the mobile apparatus for outputting the second data, e.g. on the basis of user and/or deliverer data, e.g. a mobile radio number, email address, and/or device medium access control (MAC) address.

The second data may be identical to the first data, for example. Alternatively, the second data may be different than the first data, but nevertheless comprise the access information encrypted with the key and the indicator. The second data may comprise, for example, in addition to the access information encrypted with the key and the indicator, further pieces of information, for example the identifier of a compartment installation or some other identifier of the apparatus or system from which the first data were acquired. Such an identifier may for example likewise at least partly have been contained in the first data or be contained only in the second data. Outputting the second data, which may be communicating the second data, may be performed here in one of the ways already described generally above for communicating data, that is to say e.g. as part of one or more packets or messages, e.g. via an Internet connection and/or a mobile radio network.

The method in accordance with the second exemplary aspect of the invention comprises acquiring second data, wherein the second data comprise at least access information encrypted with the key and an indicator. The data may be acquired for example from an apparatus or a system which performs the method in accordance with the third aspect of the invention. In this case, the acquiring may be performed by way of one of the possibilities described generally for acquiring data.

The method in accordance with the second exemplary aspect of the invention furthermore comprises decrypting the access information encrypted with the key. Advantageously, the apparatus which generated the key for encrypting the access information also performs the decryption. This is because if the encryption is a symmetric encryption, for example, it is then sufficient that the key was stored in order to be able to utilize it for the decryption. If the encryption is an asymmetric encryption, for example, the apparatus, when generating the key, which constitutes a public key, for example, also generated an associated private key, for example, and stored it, for example. This private key may then be used for decrypting. For security purposes, decryption by the same apparatus that generated the key for decrypting is advantageous since the fewest devices possible thus have to acquire, process and/or store the key. Furthermore, an asymmetric encryption is particularly advantageous since the private key required for decrypting need not leave the apparatus that generates it. In particular, the private key need not be transmitted via a potentially insecure connection in order possibly to be stored on an apparatus, for example a server, that is potentially insecure and/or attacked frequently, for example via the Internet. If the private key is known only to the apparatus which performs the generating of the key and the decrypting, a potential attacker must thus have full control over the apparatus, for example, in order to acquire the private key. This is for example generally very complicated and particularly for an attacker if the apparatus is another person's smartphone, for example. In particular, an attacker wanting to gain access to a plurality of keys and/or pieces of access information must for example gain control over a plurality of apparatuses, e.g. smartphones of users, if for example only in each case one (private) key is stored on an apparatus.

The method in accordance with the second exemplary aspect of the invention furthermore comprises generating a code word on the basis of at least the access information. By way of example, the code word is generated by implementing a one-way function with at least a portion of the access information as input data. A one-way function may be distinguished for example by the fact that the calculation of the function itself is simple in comparison with the calculation of the inverse function thereof. In particular, it may in practice not be possible for example actually to find an inverse function of a one-way function at all, such that the inverse operation may be found only by means of tables or by trying out. One example of a one-way function is a hash function, e.g. the Secure Hash Algorithm (SHA), SHA-2, in particular SHA-256, or the Message Digest Algorithm 5 (MD5). However, generating the code word may additionally be based on further pieces of information, for example a portion of the second data and/or the indicator contained in the second data.

Generating the code word may be triggered by an event, for example, and/or be performed for example automatically after decrypting the access information and/or after a predetermined time duration and/or at a predetermined time. Such an event may be for example a user input, for example on the apparatus that generates the code word. This may be done for example by a user calling up a specific app on his/her smartphone and/or operating it in a certain way, e.g. by enabling a specific tab in the app. Alternatively or additionally, such an event may be for example the apparatus which generates or will generate the code word approaching another apparatus, for example a compartment installation. In this case, it is advantageous if the event only or at least also consists in a user input or comprises the latter, in order to prevent unwanted triggering, e.g. if the user approaches the apparatus, for example the compartment installation, but this approaching is not deliberate and/or intentional, but rather incidental and/or unintentional, for example if the user drives past the apparatus, e.g. the compartment installation, with a vehicle, e.g. with a different destination, for example an underground car park. However, if such an event for example only or also comprises the apparatus which generates or will generate the code word approaching another apparatus, for example a compartment installation, the code word is generated for example only or also in reaction to the apparatus which generates the code word having ascertained that it is situated in a predetermined proximity, for example at a distance of less than 1 km, 100 m, 50 m, 20 m, 10 m, 5 m, 1 m from a compartment installation. In this case, the compartment installation may be for example the compartment installation to which or to one or more of whose compartments the code word gives authorization and/or is intended to give authorization. The apparatus may detect, ascertain, determine or estimate the proximity for example by means of locating data, for example GPS data, and/or by means of the reception of further data, for example Bluetooth beacons or the like from the compartment installation. The proximity may for example also be detected, ascertained, estimated and/or determined on the basis of other received radio data, for example on the basis of cell indicators of mobile radio networks and/or Basic Service Set Identification (BSSID) of WLAN access points.

The method in accordance with the second exemplary aspect of the invention furthermore comprises communicating third data to a compartment installation or providing third data for a compartment installation in order to acquire access to the compartment installation or to one or more compartments of the compartment installation, wherein the third data comprise at least the code word and the indicator. The third data may comprise for example further pieces of information and/or data in addition to the code word and the indicator. In this case, data, in particular also the third data, and the constituents thereof, for example code word and indicator, may in principle be communicated and/or provided jointly or separately. The communicating may be performed for example via an Internet connection or a radio connection such as Bluetooth, NFC, WLAN, 4G or 5G. The data may then be sent in one or more packets, for example. However, the providing may also be performed for example by means of at least one optical pattern such as a barcode or QR code, which is displayed for example by a screen of the apparatus which performs this step of the method. The providing may alternatively or additionally also occur for example by means of the display of letters and/or numbers representing the third data or at least a portion thereof. Communicating third data to a compartment installation or providing third data for a compartment installation may be triggered for example by an event or a combination of events, for example the event or events described for triggering the generating of a code word in the preceding paragraph. In this case, it is advantageous here, too, if the event only or at least also consists in a user input, e.g. as described in the preceding paragraph, or comprises the latter, in order to prevent unwanted triggering.

The method in accordance with the first exemplary aspect of the invention comprises acquiring or capturing third data from an apparatus having the key for decrypting the encrypted access information, wherein the third data comprise a code word and an indicator. The apparatus having the key for decrypting the encrypted access information may be for example a mobile apparatus, for example a smartphone. The apparatus may be e.g. the apparatus of a recipient of a shipment and/or of a deliverer and/or of some other person or organization that, under certain circumstances, is intended to have the possibility of having access to a compartment installation or to at least one compartment of the compartment installation.

The third data may be captured or acquired from the apparatus, for example via an Internet connection, a radio connection such as Bluetooth, NFC, WLAN, 4G, 5G and/or for example by capturing an optical pattern such as a barcode or QR code, which is displayed e.g. on a screen of the apparatus that provides the third data. However, acquiring or capturing the third data from the apparatus may also be performed indirectly, that is to say for example by the apparatus from which the third data are acquired sending the third data to a forwarding apparatus and the third data being acquired from the forwarding apparatus. Additionally or alternatively, the third data may for example also be acquired by the apparatus from which the third data are acquired outputting the third data, for example as letters and/or numbers. A person may then read them off, for example. Subsequently, the third data may then be input by the person for example via a keyboard or some other capturing unit of the apparatus which acquires or captures the third data, such that the apparatus acquires the third data in this way from the apparatus having the key for decrypting the encrypted access information.

The process of communicating and/or providing the third data and correspondingly capturing or acquiring the third data may for example only be possible in such a way that an apparatus and/or a user wanting to communicate and/or provide the third data must be situated in proximity to the capturing or acquiring apparatus (that is to say e.g. at a distance of less than an arm length, 1 m, 5 m, 10 m, 50 m, 1 km, within the same radio cell, within range of a short-range radio connection, e.g. NFC or WLAN or Bluetooth connection, or in facial range) and/or that third data may be communicated and/or provided and/or acquired and/or captured only at a predetermined, e.g. maximum, speed. One example of this is a Bluetooth or NFC transmission from a smartphone to the compartment installation, for example. A further example is one or more optical patterns being provided by a mobile apparatus and the pattern or patterns being captured by a compartment installation, for example. A further example is a user input on the compartment installation, wherein the data that are input correspond for example to the third data provided by a mobile apparatus and read off by a user.

An exemplary limitation of the maximally and/or practically achievable speed at which the third data are communicated/provided/acquired/captured may be advantageous in terms of security aspects. This is because an attacker may for example attempt, e.g. in the context of a brute force attack, to send a plurality of third data with different code words and/or indicators to a compartment installation in order to test whether one or more of these third data authorize access to the compartment installation or to one or more compartments of the compartment installation (that is to say that the attacker attempts to guess third data that authorize access). By virtue of the limitation for example of the maximum and/or practically achievable speed at which the third data are communicated/provided/acquired/captured, the time required per third data for communicating increases. An attack based on as many third data as possible being communicated (that is to say that the attacker would like to make as many attempts at guessing as possible) then takes longer than if the third data could be communicated faster. However, a code word is valid only for a limited time, for example. The slower the transmission of third data, the fewer third data an attacker may try out in this limited time. The probability of an attacker randomly communicating to a compartment installation third data which actually authorize access (that is to say randomly guessing correctly) thus decreases. By way of example, brute force attacks are thus made more difficult. By way of example, in return the length of the code word and/or of further data which are communicated to the compartment installation in order to acquire access to one or more compartments of the compartment installation may then be reduced. This is because the time required for a brute force attack is then for example nevertheless not shorter or significantly shorter than if the code word were longer but could be communicated faster. Such a reduction of the length is advantageous, for example, because then overall fewer data have to be transmitted and/or processed, for example at the compartment installation and/or at an apparatus which communicates the data to it or provides the data for it. The exemplary requirement that an apparatus and/or a user must be situated in physical proximity to a compartment installation for the purpose of communicating the third data to the compartment installation may also increase the security of the compartment installation, for example, by virtue of the fact that the compartment installation cannot be attacked from a remote location, for example via the Internet.

Furthermore, a transmission of the third data which does not make use of an Internet connection achieves the advantage that the apparatus which acquires or captures the third data and/or the apparatus which communicates or provides the third data do(es) not require an Internet connection at the time of the transmission of the third data. This is particularly advantageous, for example, if a compartment installation is intended to acquire the third data from a smartphone for example at a location at which there is no stable Internet connection. This would be the case for example in an underground car park or rural areas where the mobile radio network coverage is insufficient as a basis for the Internet connection. Although the transmission of the first and second data between different apparatuses may nevertheless require an Internet connection, the exact time at which the Internet connection is present is then not crucial, for example, as long as at some point in time, for example after a shipment has been introduced into a compartment of the compartment installation and before a user would like to collect a shipment introduced into a compartment installation for said user, an Internet connection was available at least for a short period. In particular, in this way a compartment installation at such a location functions more reliably than if an Internet connection to a server is required in order to ascertain whether a user who would like to authenticate himself/herself vis-à-vis the compartment installation is authorized to acquire access to one or more compartments.

The method in accordance with the first exemplary aspect of the invention furthermore comprises determining (e.g. selecting) access information on the basis of at least the indicator contained in the third data. The determining is performed for example on the basis of the association between the indicator and the access information. If for example the apparatus which performs the determining has access to a data structure, e.g. a table, comprising an assignment of indicators to respective associated pieces of access information, during the process of determining, for example, the access information may be determined on the basis of the indicator contained in the third data using the data structure. Alternatively or additionally, the determining process may involve for example determining firstly a compartment with which the indicator is associated and subsequently access information which is associated with the same compartment, that is to say is assigned thereto, for example. This may be advantageous. This is because the method in accordance with the first exemplary aspect of the invention may be performed for example by a compartment installation having a plurality of compartments, some or all compartments of which are associated with respective access information. By way of example, ascertaining whether a code word authorizes access to one or more compartments of the compartment installation may then be made more efficient by the indicator. This takes place for example by virtue of the fact that access information required for the ascertaining may be determined on the basis of at least the indicator and, for example, the fact of whether the code word authorizes access does not have to be ascertained in each case on the basis of a plurality or all of the known pieces of access information.

The method in accordance with the first exemplary aspect of the invention furthermore comprises ascertaining, on the basis of at least the determined access information, whether the code word authorizes access to the compartment installation or to one or more compartments of the compartment installation. By way of example, it is possible to ascertain that the code word authorizes access if an apparatus which performs the ascertaining generates from the determined access information according to a predetermined rule at least one code word which corresponds to the code word contained in the third data. By way of example, the apparatus may also generate more than one code word from the determined access information according to a predetermined rule, and ascertain that the code word contained in the third data authorizes access if only one of the generated code words corresponds to the code word contained in the third data. In particular, the apparatus may also ascertain that the code word contained in the third data does not authorize access if the apparatus indeed generates one or more code words from the determined access information according to a predetermined rule, but none of these code words corresponds to the code word contained in the third data. The predetermined rule according to which the apparatus or the system which performs the ascertaining generates at least one code word from the determined access information according to a predetermined rule is, for example, also the rule which the apparatus which generated the code word contained in the third data used for generating the code word.

Alternatively, the apparatus, e.g. a compartment installation, which performs the ascertaining, during the ascertaining process, may for example perform an operation and/or transformation on the code word contained in the third data and compare the result of the operation and/or transformation with the determined access information. By way of example, it is then possible to ascertain that the code word authorizes access to the compartment installation or to one or more compartments of the compartment installation if the result of the operation and/or transformation corresponds to the determined access information. By way of example, it is also possible to ascertain that the code word does not authorize access to the compartment installation or to one or more compartments of the compartment installation if the result does not correspond to the determined access information. In this case, the operation and/or transformation are/is for example the inverse of the rule which the apparatus which generated the code word contained in the third data used for generating the code word.

The process of ascertaining whether the code word authorizes access to the compartment installation or to one or more compartments of the compartment installation involves ascertaining for example the compartment and/or compartments to which the code word authorizes access. Additionally or alternatively, the process involves ascertaining for example whether the code word authorizes access to the compartment installation, that is to say e.g. to all compartments and/or to an arbitrary compartment of the compartment installation and/or to a special compartment of the compartment installation and/or to a controller of the compartment installation and/or a (special) functionality of the compartment installation. A special compartment of the compartment installation may include for example technical components of the compartment installation, e.g. a modem, a control module and/or a power switch. Access to such a special compartment may be required for example for an engineer, e.g. for maintenance of the compartment installation. An access for controlling the compartment installation may likewise be required e.g. for an engineer. In this regard, an engineer may e.g. install updates and/or implement settings. Such settings may include, by way of example, which compartments may be used for ordinary shipments, which compartments may not be used e.g. on account of technical faults and/or which compartments may be used for example for extraordinary purposes, e.g. valuable objects, and therefore ought to have for example increased or other requirements in respect of an authentication of a user by the compartment installation. A code word may for example also authorize access to a (special) functionality. A (special) functionality may be for example precisely such a special authentication for collecting a valuable object from a specially secured compartment. However, a further functionality might for example also be the placing of returns by a user. Yet another functionality might be available for example for the police and/or customs. This functionality might then enable for example a police or customs officer to have access to an arbitrary compartment selected by the police or customs officer.

In one exemplary embodiment, during the process of ascertaining on the basis of at least the determined access information it is ascertained that the code word—if it authorizes access—authorizes only access to a compartment with which the determined access information is associated. By way of example, if a compartment installation generates one or more code words from the determined access information according to a predetermined rule and ascertains that the code word contained in the third data authorizes access because one of the generated code words corresponds to the code word contained in the third data, the compartment installation in this case for example also ascertains that the code word authorizes for example only access to the compartment with which the determined access information is associated. Alternatively or additionally, during the process of ascertaining on the basis of at least the determined access information it may be ascertained, for example, that the code word—if it authorizes access—authorizes only access to compartments which contain respective shipments which are associated with the shipment in the compartment which is associated with the determined access information. That may be the case, for example, if the respective shipments in the respective compartments are associated with an identical user identifier, that is to say for example are all intended for the same recipient. Alternatively or additionally, during the process of ascertaining on the basis of at least the determined access information it may be ascertained, for example, that the code word—if it authorizes access—authorizes access to the compartment installation, that is to say for example to all compartments and/or an arbitrary compartment and/or a special compartment of the compartment installation and/or to a controller of the compartment installation and/or a (special) functionality of the compartment installation. Such access to the compartment installation may be reserved for example only for user circles with a predetermined function, for example engineers, police officers and/or deliverers.

The method in accordance with the first exemplary aspect of the invention furthermore comprises granting access to the compartment installation or to one or more compartments of the compartment installation, wherein a necessary condition for granting access is that it was ascertained that the code word contained in the third data authorizes access to the compartment installation or access to the one or more compartments of the compartment installation. Upon granting access to the compartment installation or to one or more compartments of the compartment installation, for example, the compartment or the plurality of compartments of the compartment installation may be opened and/or the respective doors of the compartments may be unlocked. A necessary condition for this, however, is that it was ascertained that the code word contained in the third data authorizes access to the compartment installation or access to the one or more compartments of the compartment installation that are intended to be opened or unlocked. In particular, access is granted to no compartment, for example, if it was not ascertained or was not able to be ascertained that the code word contained in the third data authorizes access to the one or more compartments of the compartment installation. Upon granting access to the compartment installation or to one or more compartments of the compartment installation, for example, in principle, access to compartments of the compartment installation which are not compartments for which it was ascertained that the code word contained in the third data authorizes access to them may also be denied. The compartments are then not opened, for example, and/or their respective doors are not unlocked.

Granting access to the compartment installation or to one or more compartments of the compartment installation may for example also depend on further conditions. By way of example, a further necessary condition for granting access to a compartment may be that it was ascertained that a user, for example a recipient of shipments, desires access to this compartment. By way of example, the code word contained in the third data may indeed authorize access to a plurality of compartments of the compartment installation, but a recipient of shipments situated in the compartments may for example only desire access to some of those compartments to which the acquired or captured code word authorizes access. The compartments to which access is desired may be captured for example by a user input, for example via a capturing unit such as a keyboard or a touch-sensitive screen. The compartments to which access is desired may alternatively or additionally be determined for example on the basis of data which are acquired from a for example mobile apparatus of a user. Access is then granted for example only to the compartments to which the code word authorizes access and to which access is desired and/or which a user has selected from the set of compartments for which the code word authorizes access. The user may then acquire access to the compartments that the user has not opened for example at a later time with a different indicator and code word.

The necessary condition for granting access that it was ascertained that the code word contained in the third data authorizes access to the compartment installation or access to the one or more compartments of the compartment installation may also furthermore be combined with further conditions. In particular, these may for example be combined in any desired way, for example using AND or OR or other logical combinations. In the case of three exemplary conditions A, B and C, for example, the combination (A AND B) OR (A AND C) might be a necessary condition for granting access, such that access is granted if either A and B are satisfied, or A and C are satisfied, or A and B and C are satisfied.

Exemplary embodiments and further advantages of the exemplary aspects of the invention are described below, wherein their disclosure is intended to be equally applicable in each case to all three aspects of the invention.

In accordance with one exemplary embodiment of the first aspect of the invention, first data are output to an apparatus or to a system which is configured to communicate data to the apparatus having a key for decrypting the encrypted access information. That is to say that, for example, a compartment installation outputs the first data to an apparatus or to a system which performs for example the method in accordance with the third aspect of the invention. The apparatus having a key for decrypting the encrypted access information may be for example a mobile apparatus of a user or deliverer. The exemplary mobile apparatus may have generated and stored the key at an earlier time, for example. In addition or as an alternative to the outputting of the first data described above in this paragraph, the first data may also be output directly to the apparatus having a key for decrypting the encrypted access information. By way of example, a compartment installation might thus output the first data, e.g. via Bluetooth or NFC, directly to a mobile apparatus having a key for decrypting the encrypted access information. The mobile apparatus might then acquire the first data.

In accordance with one exemplary embodiment of the first aspect of the invention, the code word only authorizes access to compartments of the compartment installation in which respective shipments associated with an identical user identifier are situated. In this case, the method in accordance with the first aspect of the invention comprises for example one or more of the following method steps: determining a compartment with which the indicator contained in the third data is associated; determining the user identifier on the basis of information concerning a shipment situated in the determined compartment, wherein the user identifier is for example the user identifier of a recipient of the shipment; determining one or more further compartments in which respective shipments associated with the determined user identifier are situated. In this way, for example, a procedure in which data and/or code words are communicated and/or provided to the compartment installation and are captured and/or acquired and/or processed by the compartment installation need not be performed for each compartment in which there is a shipment for a recipient. Instead, for example, a procedure of communicating/providing and respectively acquiring/capturing a code word is sufficient in order that the compartment installation may ascertain that a user is authorized to acquire access to a plurality of compartments.

The user identifier may be for example a number, e.g. a post number, or some other sequence or combination of digits and/or letters and/or bits which identifies a user and/or a group of users. A user may be for example a registered customer who was allocated a user identifier in the context of the registration or chose it in the context of the registration. A user may for example also be a deliverer that was allocated a user identifier, for example. A deliverer may be e.g. a human deliverer or a mechanical deliverer, e.g. a robot and/or a drone.

In the context of shipments being introduced, for example, a compartment installation may ascertain or be informed about the user identifier with which a respective shipment is associated and the compartment into which the respective shipment was placed. By way of example, the compartment installation may capture at least a portion of these pieces of information by means of a user input and/or acquire same from a device. By way of example, the compartment installation may acquire at least a portion of these pieces of information from a deliverer device which for example scanned a label of a shipment in the context of the introducing and forwards at least a portion of the pieces of information thus acquired to the compartment installation. Alternatively or additionally, the compartment installation may also capture pieces of information concerning a respective shipment, e.g. a user identifier associated with the shipment, by means of a scanner and/or other sensors.

A shipment is associated for example only with one user identifier, e.g. of the recipient. Alternatively, a shipment is associated for example with two user identifiers, e.g. of a recipient and of a sender. Alternatively, a shipment is associated with more user identifiers.

In accordance with one exemplary embodiment of the first aspect of the invention, a necessary condition for ascertaining that the code word authorizes access to the compartment installation or to one or more compartments of the compartment installation is that it is ascertained that the code word was generated on the basis of at least information corresponding to the determined access information. This ascertaining may be performed for example by generating one or more code words in each case on the basis of the access information and comparing the generated code words with the code word contained in the third data. The code word authorizes access to the compartment installation or to one or more compartments of the compartment installation for example if and only if a correspondence has been ascertained. This condition may for example be the sole necessary condition, but alternatively also one of a plurality of necessary conditions. A further necessary condition may be for example that the code word was generated in a time window determined according to a predefined rule and/or was acquired by means of the third data in a time window determined according to a predefined rule.

In accordance with one exemplary embodiment of the first aspect of the invention, for example, a further necessary condition for ascertaining that the code word authorizes access to the compartment installation or to one or more compartments of the compartment installation is that it is ascertained that the code word was furthermore generated on the basis of a time value (that is to say for example a representation of a time of day and/or a date) which corresponds to a current time value (for example determined using a clock of the compartment installation or acquired from a server) of the compartment installation or is in a predefined relation to the current time value of the compartment installation. By way of example, the compartment installation may acquire a time value by means of a transformation proceeding from the code word and may compare said time value with the time value which the compartment installation has. By way of example, the code word is only valid if the acquired time value lies in a predetermined time interval, e.g. 60 seconds, before or after the current time value. Alternatively or additionally, the compartment installation may utilize a current UNIX time value that is rounded, e.g. to 60 s, and a previous or future time value in order to generate a respective code word on the basis of the respective time value and the access information and to compare said code word with the code word contained in the third data. The code word authorizes access for example only if one of the generated code words corresponds to the code word contained in the third data. A temporal limitation of the validity of a code word, as described e.g. in this paragraph, makes it possible to increase the security of the compartment installation by virtue of the fact that only a time predetermined by the time limitation is available to an attacker for an attack before a new code word is required. A brute force attack may thus be made more difficult, for example.

In accordance with one exemplary embodiment of the first aspect of the invention, the access information is generated in order to enable access to the compartment installation for one or more user circles with in each case a predefined function independently of a shipment. In this case, the indicator is associated with the access information for example at least in such a way that the access information is uniquely assigned to a user circle with a predefined function (for example by virtue of said user circle having been uniquely assigned by the compartment installation or some other apparatus) and that the indicator is associated with the user circle with said predefined function. A predefined function might be for example the role as engineer, (federal) police officer or deliverer. A respective user circle might then comprise for example one or more engineers, one or more police officers or one or more deliverers. Particularly in the case of the deliverers, however, for example, a plurality of user circles with in each case a predefined function might also be defined, e.g. one each for mechanical deliverers and human deliverers. In this case, the fact that access information is generated in order to enable access to the compartment installation for one or more user circles with in each case a predefined function independently of a shipment does not exclude further pieces of access information being generated for other purposes, that is to say for example for ordinary recipients.

Generating access information in order to enable access to the compartment installation for one or more user circles with in each case a predefined function independently of a shipment may be performed for example in reaction to the fact that in the method in accordance with the first aspect of the invention, not just a key was acquired but at the same time (or later or beforehand) also role information associated with the key, that is to say for example assigned thereto, that is to say for example information about a user circle with a predefined function. In one exemplary embodiment of the first aspect of the invention, therefore, the method comprises e.g. acquiring assignment information on the basis of which the key is assignable to a user circle with a predefined function. This assigned role information, also referred to here as assignment information, may for example be regularly or irregularly updated, that is to say e.g. acquired anew, for example daily. New access information may then be generated upon each update, for example. In some embodiments, such access information may also authorize access for example only in a predetermined period of time or during a predetermined duration, e.g. by virtue of said access information subsequently being marked as "invalid" or erased. In accordance with one exemplary embodiment of the first aspect of the invention, the access information may thus be generated in order to enable access to the compartment installation for the user circle with said predefined function independently of a shipment, wherein the indicator is associated with the access information at least in such a way that the access information is uniquely assigned to a user circle with said predefined function and that the indicator is associated with the user circle with said predefined function.

In order to trigger the generating of access information for a user circle with a predefined function e.g. at a compartment installation, in the method in accordance with the second aspect of the invention, for example, a key may be assigned to specific role information, e.g. on a mobile device which performs e.g. a method in accordance with the second aspect of the invention. Additionally or alternatively, such an assignment may also be performed in the method in accordance with the third aspect of the invention, e.g. by one or more servers. The key and/or the role information (or information representing this information and/or this assignment; that is to say the assignment information) may then be communicated to an apparatus or to a system which is configured to communicate the key and/or the assigned role information (that is to say the assignment information) to a compartment installation. The transmission to the one or more compartment installations may subsequently be performed in a manner comparable to the transmission of the key in the method in accordance with the third aspect of the invention. In particular, the method of one exemplary embodiment of the second or third aspect of the invention may thus comprise one or more of the following steps: acquiring or generating assignment information on the basis of which the key is assignable to a user circle with a predefined function; and communicating the assignment information to the compartment installation or to an apparatus or to a system which is configured to communicate the assignment information to the compartment installation (that is to say for example an apparatus or a system which performs the method in accordance with the third aspect of the invention). In this case, the access information may be generated by the compartment installation in reaction to the assignment information being acquired, by way of example.

Furthermore, in the case of the assignment of role information to a key, by way of example, a compartment installation assignment may also be performed, e.g. on the mobile device. This information about the assignment and/or association with a compartment installation, also referred to as association information, in the method in accordance with the second aspect of the invention, may then likewise be communicated (for example together with the key and/or the role information or alternatively separately therefrom) to an apparatus or to a system which is configured to communicate the key and/or the role information and/or the compartment installation assignment to one or more compartment installations. These may be e.g. precisely those compartment installations with which the key and/or the role information (about the association information) are/is associated.

Alternatively or additionally, the assignment of a key to specific role information and/or the compartment installation assignment (that is to say the association information), described above, may also be performed by a server or some other apparatus, by way of example. Such an apparatus may be managed and/or supervised and/or controlled for example by an organization which for example also manages and/or supervises mobile devices for one or more user circles and/or makes them available to persons. This may be e.g. an organization which does not manage the compartment installations described here, that is to say for example an "external service provider". One or more of the described assignments may then be performed for example by the organization by means of the apparatus, e.g. the server and/or computer supervised by it. The key and/or the assigned role information and/or the compartment installation assignment (that is to say assignment and/or association information) may then be communicated (e.g. in the form of a digitally signed authorization notification) for example from this apparatus to an apparatus or to a system, e.g. a server or a server system, which is configured to communicate the key and/or the assigned role information and/or the associated compartment installation assignment to the compartment installation thus assigned (e.g. only under the condition that the digital signature of the authorization notification was checked as valid). At the compartment installations, respective pieces of access information may then be generated, for example, which in turn are (may be) output as part of first data, for example, as described in the method in accordance with the first aspect of the invention. The organization, for example by means of the apparatus assigned to it, e.g. a server, may thus influence and/or wholly or partly control the generation of access information for which mobile devices at which compartment stations, such that these mobile devices are authorized for access at the respective compartment stations. The above-described assignment of a key to specific role information and/or a specific compartment installation may for example be updated regularly, e.g. daily. The organization which controls such an assignment may thus control daily, for example, which mobile devices are intended to be authorized for access to which compartment installations. In particular, the method in accordance with one exemplary embodiment of the second or third aspect of the invention may thus furthermore comprise: acquiring or generating association information before the key and/or before the assignment information are/is communicated to the compartment installation, wherein the association information associates the key with the compartment installation to which the key and/or the assignment information are/is communicated or are/is intended to be communicated.

Once then for example access information has been generated in order to enable access to the compartment installation for one or more user circles with in each case a predefined function independently of a shipment, with this access information it is possible to adopt a procedure in accordance with one exemplary embodiment of the first aspect of the invention. That may thus be in particular e.g. as would also be the case with the access information for an average shipment recipient (here as differentiation with respect to a user circle). Alternatively, however, it is also possible to adopt a different procedure. By way of example, second data may be output/communicated, in the method in accordance with the third aspect of the invention, not only to the mobile apparatus from which a key was acquired, but also e.g. to further mobile apparatuses which for example have the same key and/or are assigned to the same role information and/or for which for example an assignment to a compartment installation was performed by a delivery organization as described above. If for example a plurality of mobile apparatuses have the same key, this may have an advantage. That is because the number of mobile devices which may have access to an apparatus in accordance with the first aspect of the invention, e.g. a compartment installation, is—insofar as each mobile device is intended to have its own key—limited by the fact that the apparatus in accordance with the first aspect of the invention also has to provide a dedicated indicator for each mobile device of this type. The total number of possible indicators is possibly limited, however. It may therefore be advantageous if a plurality of mobile devices have the same key. These then also require only one indicator, such that the number of mobile devices which may have access to an apparatus in accordance with the first aspect of the invention, e.g. a compartment installation, is no longer limited per se by the total number of available indicators.

The above-described exemplary generating of access information in order to enable access to the compartment installation for one or more user circles with in each case a predefined function independently of a shipment makes it possible e.g. for specific user circles to update daily, for example, their role on their mobile device for specific compartment installations, to which they are subsequently authorized to have access by the method described. That is to say that, for example, a deliverer as part of the user circle "deliverers" on a mobile device for or on one day for one or more compartment installations may trigger there the generating of pieces of access information (and ultimately also the acquiring of same at the mobile device). In this case, the mobile device may for example not be assigned to the deliverer personally, but rather e.g. to the delivery organization. Whether and to what extent a specific deliverer may then control the mobile device and/or trigger the generating and/or the acquiring of pieces of access information described then, for example, by means of user and authorization management and logging-on at the mobile device itself (e.g. on the basis of NFC and an identity card, e.g. a post identity card), is regulated, controlled and/or predefined, for example by means of the delivery organization. Additionally or alternatively, for example, a server or some other apparatus, e.g. of the delivery organization, may trigger the generating and/or the acquiring of pieces of access information described, e.g. by virtue of this apparatus notifying an apparatus or a system which is configured to communicate the key and/or the assigned role information to a compartment installation as to which mobile devices are intended to be authorized for access for which compartment installations. Such a notification may be performed for example regularly, e.g. daily. Second data may then be output or communicated, in the method in accordance with the third aspect of the invention, to the notified mobile apparatuses, for example.

In principle, in this case, for example, the access which is required by such user circles or may be required at some points in time differs from that required by an average recipient of shipments, who, for example, is intended only to have access to one or more compartments with the shipments for said recipient. The compartment installation may ascertain for example on the basis of the indicator that—in the case of positive ascertaining that the code word authorizes access—the customary compartment installation program for granting access for an ordinary user is not intended to proceed, rather that for example a special program is intended to be implemented. The special program enables access to the entire compartment installation, for example, that is to say e.g. all compartments and/or an arbitrary compartment. In order that such access to the compartment installation, which is not possible for ordinary users, for example, becomes possible for those who are authorized, by way of example, in one exemplary embodiment in accordance with the first aspect of the invention, a further necessary condition for ascertaining that the code word authorizes access to the compartment installation is that it is ascertained that the indicator contained in the third data is associated with a user circle with a predefined function. If it was ascertained that the code word authorizes access to the compartment installation, then for example a special program which was individualized for a respective user circle, for example, may be implemented. To that end, the compartment installation then ascertains on the basis of the indicator, for example, which special program is intended to be implemented.

In accordance with one exemplary embodiment of the first aspect of the invention, a code word for which it was ascertained that said code word authorizes access to the compartment installation or to one or more compartments of the compartment installation does not authorize access anew or at least does not authorize access anew during a predefined time interval after this ascertaining. For this purpose, for example, each code word for which it was ascertained that it authorizes access to the compartment installation or to one or more compartments of the compartment installation is stored. If this code word is then acquired anew, for example by means of third data, it does not authorize access anew. In this way, for example, an attacker who for example eavesdrops on a radio transmission of third data comprising a code word and/or monitors a user input of a code word at a compartment installation may be prevented from subsequently being able to use the code word to acquire access.

In accordance with one exemplary embodiment of the first and/or second aspect of the invention, the process of communicating the third data to the compartment installation or the process of providing the third data for the compartment installation—and the corresponding acquiring or capturing by the compartment installation—is performed by means of one or more of the possibilities a)-d): a) by means of a radio connection, in particular Bluetooth or NFC; b) by means of an optical pattern which represents the third data and which is displayed on a screen of the mobile apparatus for capture by a capturing unit of the compartment installation; c) by means of displaying the third data on a screen of the mobile apparatus for visual capture by a person, who then inputs the third data on an input unit of the compartment installation, in particular a keyboard or a touch-sensitive screen; or d) by means of an acoustic communication, for example by an apparatus or person reading aloud the third data and the compartment installation capturing them by means of speech recognition (but some other acoustic communication, for example by means of acoustic characters, or other types of modulation, is also possible). What is achieved by these types of communication is, for example, that an apparatus and/or a user are/is in proximity to the capturing or acquiring apparatus and/or that the third data may be communicated and/or acquired or captured only at a predetermined, e.g. maximum, speed, thereby affording the already described advantages resulting therefrom.

In accordance with one exemplary embodiment of the first and/or second aspect of the invention, the indicator contained in the third data is represented by a first group of bits, the code word contained in the third data is represented by a second group of bits, and in the third data the bits of the first group and the bits of the second group are mixed according to a predetermined rule. The indicator may thus be represented for example by an arbitrary number of bits, for example 1 bit, 2 bits, 3 bits, 10 bits, 12 bits or more bits. In this case, it may for example also be represented by apparently logically separate elements, for example by a first subgroup of bits and a flag. Equally, the code word may also be represented by an arbitrary number of bits, for example 10 bits, 50 bits, or 100 bits, and be represented by for example apparently logically separate elements.

The indicator contained in the third data is for example not encrypted with the key with which the access information was encrypted, and may therefore be evaluated for example by an apparatus which captures or acquires the third data. The apparatus may determine access information for example on the basis of the indicator in order then to be able to ascertain on the basis of said access information whether the code word authorizes access. Since, however, the indicator may thus at least indirectly contain pieces of information which might possibly be helpful to a potential attacker to acquire access to the compartment installation, it is advantageous that a potential attacker cannot differentiate for example which bits in the third data are part of the indicator and which bits are part of the code word. The bits representing the indicator are thus hidden and/or masked for example between the other data, in particular in the code word represented by bits. This may be done for example according to a predetermined rule; by way of example, the bits representing the indicator are always at the respective same places between the code word bits. However, the bits representing the indicator may also be positioned at changing places, for example depending on the time of day and/or a value of the indicator and/or a part of the indicator. By virtue of the rule being predetermined, for example the apparatus which communicates the third data may correspondingly prepare the third data and the apparatus which acquires the third data may assign the bits contained in the third data in each case to the indicator or to the code word on the basis of knowledge of the predetermined rule. If the rule is not known to an attacker, that may e.g. make a potential attack more difficult than if the bits representing the indicator and the bits representing the code word were easily assignable.

In accordance with one exemplary embodiment of the first and/or second aspect of the invention, the code word is generated on the basis of at least access information and a time value. The time value may be for example a current time value of the apparatus generating the code word. The time value may for example also specify a time from which, in which or until which the code word is valid. In principle, the time value may be for example a rounded time value, for example to 60 seconds. The code word may furthermore be generated e.g. on the basis of further pieces of information, for example a further time value.

In accordance with one exemplary embodiment of the first and/or second aspect of the invention, the code word is generated using a one-way function, in particular a hash function, wherein at least a portion of access information and at least a portion of a time value are used as input data for the one-way function. By way of example, a mobile apparatus generates the code word using a one-way function, with use being made of the access information and at least a portion of a current time value, for example of a rounded UNIX time value, e.g. rounded to 60 seconds. Generating the code word may comprise for example even further steps, for example truncating the one-way function result to a predetermined length. The one-way function used may be for example a cryptological hash function, for example SHA, SHA-2 or MD5.

The code word thus generated is then for example communicated to a compartment installation or provided for the latter. Said compartment installation determines access information on the basis of the indicator contained in the third data and generates for example one or more code words, for example a respective code word on the current rounded UNIX time value, the previous rounded UNIX time value and the next rounded UNIX time value. For generating a respective code word, the compartment installation uses for example a one-way function, in particular a hash function, and otherwise also performs the same steps as the mobile apparatus. It is then possible to ascertain for example whether one of the code words generated by the compartment installation corresponds to the code word contained in the third data and therefore authorizes access. By additionally using an earlier and/or later time value, for example, it is possible e.g. to compensate for the fact that the current time of the mobile apparatus deviates from the current time of the compartment installation, for example because one of the apparatuses or even both is or are not connected to the Internet and/or a time server and/or has or have not been connected thereto for a relatively long time. Moreover, it is thus possible for example to compensate for the fact that communicating/providing and/or acquiring/capturing the third data has such a long duration that the next UNIX time value is already attained.

In accordance with one exemplary embodiment of all aspects of the invention, the access information is generated by the compartment installation in each case in the context of respective introducing, for example in reaction to the respective imminent, occurring or performed introducing, of at least one shipment into a compartment of the compartment installation. By way of example, the compartment installation generates respective access information each time when one or more shipments are introduced into a compartment. The respective access information of a compartment is for example erased and/or no longer authorizes access when the respective compartment no longer contains any shipments and/or was opened at least once after the introducing. The compartment installation may for example detect that a deliverer will introduce a shipment into a compartment, for example because the deliverer triggers the opening of the compartment. The compartment installation may generate the access information for example in reaction thereto. Alternatively, the compartment installation may for example detect that a shipment was introduced into a compartment, for example by means of sensors, e.g. weight sensors and/or infrared sensors, and generate the access information in reaction thereto. The compartment installation may for example also generate the access information in reaction to an input by the deliverer in the context of the introducing. In this case, the fact that the access information is generated in each case in the context of respective introducing, for example in reaction to the respective imminent, occurring or performed introducing, of at least one shipment into a compartment of the compartment installation, does not exclude further access information being generated for other purposes, for example in order to enable access to the compartment installation or to one or more compartments of the compartment installation for one or more user circles with in each case a predefined function.

In accordance with one exemplary embodiment of all aspects of the invention, the indicator is or has been associated with the access information at least in such a way that the access information has been uniquely assigned to a compartment of the compartment installation and the indicator is or has been associated with this compartment of the compartment installation, wherein the compartment is for example a compartment into which a shipment was introduced. By way of example, the compartment installation uniquely assigns the access information to a compartment of the compartment installation in the context of the generating of said access information. Furthermore, the compartment installation for example also associates the indicator with this compartment, that is to say assigns the indicator to the compartment, for example. Consequently, access information and indicator are for example in each case compartment-specific information. By virtue of the compartment installation acquiring an indicator by means of the third data, the compartment installation may then determine the access information required for ascertaining whether the code word authorizes access to at least this compartment. Furthermore, the compartment installation may then ascertain, for example, for which compartment—insofar as the code word authorizes access—access is intended to be granted.

In accordance with one exemplary embodiment of all aspects of the invention, the key is assigned to a user identifier, wherein, when encrypting the access information, the compartment installation uses the key assigned to said user identifier only if, in the context of respective introducing of a shipment into a compartment of the compartment installation, the latter was informed or it has been ascertained that the shipment is associated with said user identifier, wherein the shipment is associated with the user identifier for example in such a way that the user identifier is the user identifier of a recipient of the shipment. What may thus be achieved, for example, is that only a recipient has the key for decrypting the access information and is thus able to generate the code word which authorizes access to the compartment. If, for example, a user's smartphone has generated the key, for example in the context of a registration of the user at the compartment installation or as a customer vis-à-vis a server, and if the key was linked with the user identifier, for example, the user's smartphone may decrypt access information encrypted with the key by the compartment installation, generate a code word on the basis of at least the access information, communicate said code word to the compartment installation or provide it for the latter and thus acquire access to at least the compartment into which at least one shipment associated with its user identifier was introduced.

In accordance with one exemplary embodiment of all aspects of the invention, the indicator is an element from a first set, wherein the first set comprises more elements than a second set, wherein each element of the second set is assigned one-to-one to a respective compartment of the compartment installation, and wherein each element of the second set in whose one-to-one assigned compartment a shipment is situated is assigned one-to-one to an element of the first set. In this case, the first set may be for example a set of bit combinations or bit sequences. By way of example, the indicator may have a predetermined length, e.g. 10 bits. The first set may then include for example all possible values which may be formed with 10 bits, that is to say for example $2^{10}=1024$ different values or elements. A second set is contrasted therewith. Each element of the second set is assigned one-to-one for example to a physical compartment, for example a respective compartment of the compartment installation. If there are 30 compartments in the compartment installation, for example, the second set thus has 30 elements. The elements are numbers or names, for example, wherein for example a respective compartment may be identified on the basis of an element. For example in the context of introducing a shipment into a compartment, by way of example the compartment to which the element "17" from the second set is assigned one-to-one, an element from the first set, for example the element 1000110101, is assigned one-to-one to the element "17". In the context of the compartment being opened anew and/or a shipment being removed from the compartment, this assignment may for example be canceled again. The formerly assigned element, here by way of example 1000110101, is then not assigned to any compartment, for example. If, by way of example, a shipment is introduced anew into the compartment to which the element "17" from the second set is assigned one-to-one, by way of example a different element from the first set, for example 0010101101, may be assigned to the element "17". The previously utilized element 1000110101 from the first set may then be assigned one-to-one to a different element from the second set at a later point in time, for example.

The element of the first set which is assigned to an element of the second set may be selected for example randomly and/or according to a predetermined rule. By way of example, there may be a further set—called selection set here—containing only elements of the first set which are not already assigned to an element of the second set. From this selection set, the element next allocated to an element of the second set may then for example always be that element which has been an element of the selection set for the longest time. By way of example, an element of the first set is added to the selection set whenever the assignment of the element to an element of the second set is canceled. Conversely, for example, an element of the first set is removed from the selection set whenever the element is assigned to an element of the second set.

The selection set may also be present in the form of a list, for example, and for example an element, i.e. a list entry, that is at a predetermined list position may be chosen so as to be assigned next. This may be for example the first or last list entry. The addition of an element may also equally always take place at the start or at the end of the list.

The assignment principle described is advantageous in multiple respects. Thus, for example, it is known in advance how many bits must be reserved for the indicator, for example for storing and/or transmitting and/or capturing and/or acquiring and/or processing. Furthermore this is for example independent of how many compartments the compartment installation has, as long as the compartment installation has fewer compartments than the first set of elements. By way of example, the length of the indicator may be determined in a manner such as is the case for all compartment installations, for example of one type or of one operator. Furthermore, this procedure increases the security of the compartment installation against unauthorized access, in particular against attacks directed at access to a specific selected compartment, for example a particularly large compartment or a compartment where a potential attacker has observed what shipment has been introduced there. This is because a compartment is associated with a new indicator value for example each time a shipment is introduced into this compartment. Consequently, for example, which indicator is associated with which compartment is not known to any device and/or person outside the compartment installation performing the assignment. Furthermore, this procedure contributes to the security of the compartment installation by virtue of the fact that, for example, not all the indicator values are actually assigned to an element of the second set and thus to a compartment. This reduces e.g. the likelihood of a potential attacker actually having the opportunity for code words which the attacker communicates in data for test purposes, for example, to be checked by the compartment installation. This is because the compartment installation actually does not perform for example the step of ascertaining whether the code word authorizes access to the compartment installation or to one or more compartments of the compartment installation if the compartment installation was unable to determine access information on the basis of at least the indicator contained in the third data, for example because the indicator chosen by the attacker is not associated with any compartment and is thus not associated with any access information either. In this case, it is particularly efficient that these advantages may already be achieved if the indicator has or has to have a predetermined length anyway (by way of example 10 bits) because a compartment installation has a predetermined number of compartments (by way of example 513 compartments). Instead of then only using 513 of the 1024 available indicator values and leaving 511 unused, an additional security effect is achieved by means of the described procedure of assignment, without additional bits having to be transmitted.

The assignment principle described may also be understood in a manner detached from other features of one or all aspects of the invention and should also be understood as independently disclosed in this sense. In particular, the technical advantages described are also already achieved without the features of one or all aspects of the invention being required therefor. Furthermore, the assignment principle described ought also to be understood as disclosed in a more general way, that is to say in particular in relation not just to compartments of a compartment installation but rather to an arbitrary plurality of objects which may experience a state change (for example a compartment as a result of a shipment being introduced) and which are or are not intended to be associated with an indicator depending on their state.

In accordance with one exemplary embodiment of all aspects of the invention which comprises features of the last two embodiments described, which are required for this embodiment, the user identifier originates from a third set comprising more elements than the first set. In particular, the user identifier originates for example from a set of numbers having a length of 6-12 decimal places. However, a compartment installation may determine the user identifier for example on the basis of the indicator originating from the first set, for example because a shipment associated with the user identifier is situated in a compartment of the compartment installation with which the indicator is associated. Consequently, communicating and/or providing and/or acquiring and/or capturing an indicator are/is more efficient for example than communicating and/or providing and/or acquiring and/or capturing a user identifier. Furthermore, communicating and/or providing and/or acquiring and/or capturing an indicator are/is for example more secure than communicating and/or providing and/or acquiring and/or capturing the user identifier because the user identifier is assigned to a user statically, for example, and may thus be spied out and reused at a later time. By contrast, an indicator is for example regularly and/or frequently newly assigned, such that knowledge of the indicator does not allow permanent advantages to be obtained for a potential attacker.

In accordance with one exemplary embodiment of all aspects of the invention, the key is a public key of an asymmetric key pair. By way of example, the apparatus performing the method in accordance with the second aspect of the invention additionally also generates the associated private key of the asymmetric key pair. The apparatus then acquires in the second data, for example, the access information encrypted with the public key and decrypts the access information encrypted with the public key using the private key. By way of example, only the public key then leaves the apparatus that has generated the key. This is particularly secure, for example.

The above-described exemplary embodiments and exemplary configurations of all aspects of the present invention should also be understood to be disclosed in all combinations with one another.

Further advantageous exemplary configurations of the invention may be gathered from the following detailed description of some exemplary embodiments of the present invention, in particular in conjunction with the figures. However, the figures accompanying the application are intended to be used only for the purpose of elucidation, but not for determining the scope of protection of the invention. The accompanying drawings are not necessarily true to scale and are intended merely to reflect the general concept of the invention by way of example. In particular, features included in the figures are in no way intended to be regarded as a necessary part of the present invention. The order of the individual steps in the flow diagrams does not necessarily predetermine the actual (temporal) order of the steps and is merely by way of example. Nevertheless, the steps may occur/be performed temporally in exactly the sequence as illustrated in the flow diagrams. Furthermore, they may, but need not, be performed in reaction to one another.

DETAILED DESCRIPTION

Figure 1:
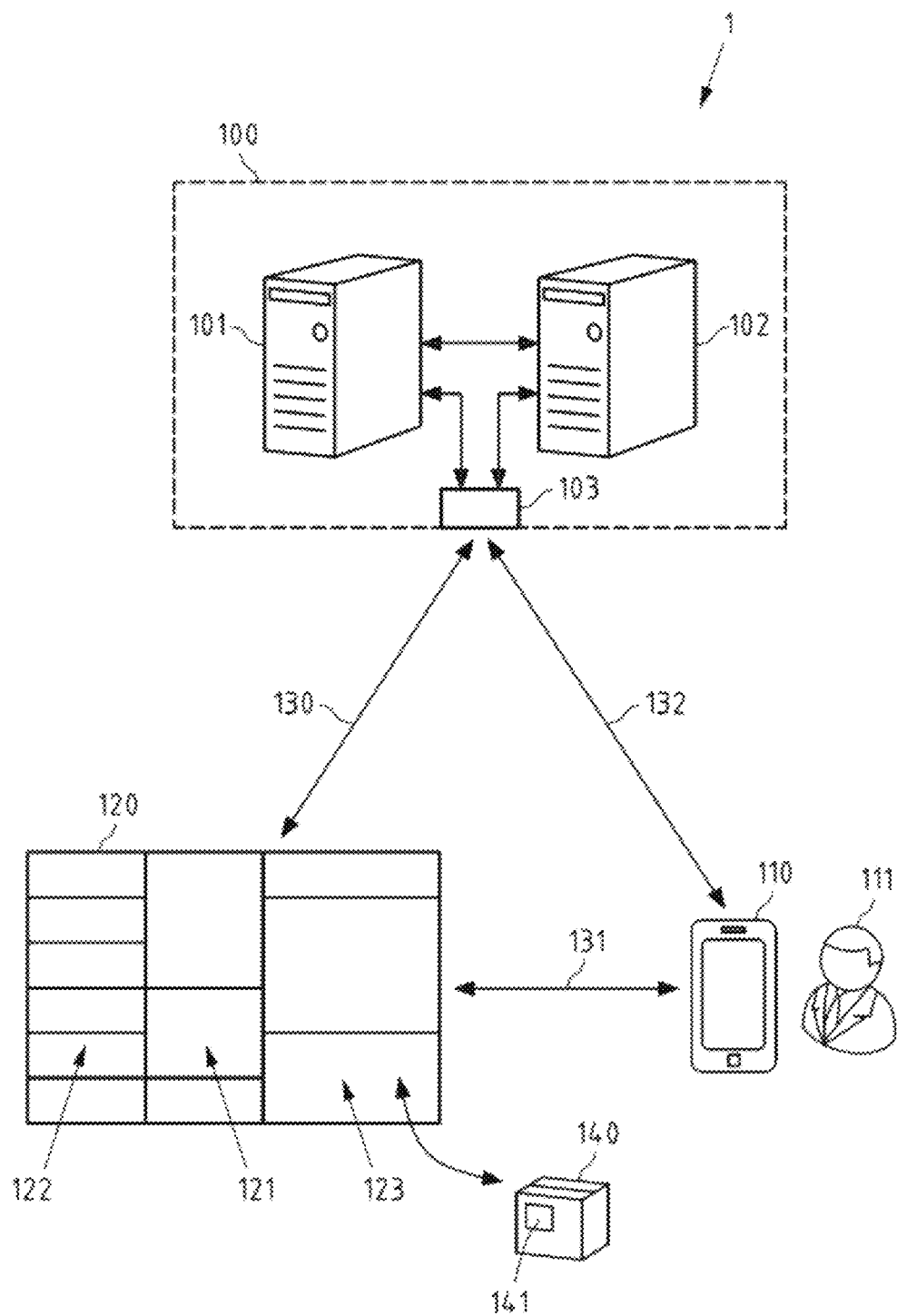
FIG. 1 shows a schematic illustration of one exemplary embodiment of a system according to the present invention, by way of example comprising a compartment installation, a mobile device and a backend system.

FIG. 1 shows a schematic illustration of one exemplary embodiment of a system according to the present invention.

The system 1 comprises a compartment installation 120 having a plurality of compartments, three compartments of which, by way of example, are provided with reference signs 121, 122, 123 in FIG. 1. Each of the compartments of the compartment installation 120 is provided for receiving one or more shipments 140 for a respective individual user 111. A plurality of compartments may also be assigned to an individual user 111. Each compartment is locked or closed in the basic state and may be electrically unlocked or opened in an instruction-controlled manner and individually by, for example, a lock control unit provided in the compartment installation 120. One example of such a compartment installation 120 is a compartment installation 120 in accordance with the applicant's known package station concept.

The compartment installation 120 is equipped with one or more communication interface(s) comprising for example an interface for wireless communication with a mobile device 110. The wireless communication connection 131 is based for example on optical transmission and/or by means of communication based on electrical, magnetic or electromagnetic signals or fields, in particular close-range communication e.g. based on Bluetooth, WLAN, ZigBee, NFC and/or RFID.

In other embodiments, however, the compartment installation 120 for example does not comprise an interface for wireless communication with a mobile device 110, or such an interface is, for example in principle or only in specific situations, not usable or is not used even though it would be usable in principle. By way of example, data which are present on the mobile device 110 (where for example they were previously decrypted after they had been transmitted there, e.g. from a system 100) and are displayed, for example, may then be communicated by means of a user 111 who inputs and thus communicates these data or a portion of these data for example via an input unit or user interface (e.g. a keyboard or a touch-sensitive screen with screen keyboard or a speech recognition module) at the compartment installation 120. By virtue that the data communicated in this way are short information, for example, such that the user for example need input little or communicate little from the mobile device 110, a short communicating time may be achieved, for example. This may be particularly advantageous, for example, if the communicating has to be performed within a predetermined, e.g., short, time, for example in order to achieve a particularly high security level, e.g. because data for authorization have only a limited temporal validity. It goes without saying that a user 111 may for example also input data which are not present on the mobile device 110 and/or not displayed there. Furthermore, a compartment installation 120 may by way of example also comprise an output unit, e.g. for displaying pieces of information, e.g. via a screen.

The compartment installation 120 is for example also configured for communication with the system 100, that is to say has for example a communication interface enabling access to the Internet or to some other network to which the system 100 is connected. The compartment installation is thus configured in particular for remote communication, that is to say has for example an interface to a cellular mobile radio system, a DSL interface or a Local Area Network (LAN) interface, by means of which it may communicate with the system 100 via the communication connection 130.

In other embodiments, however, the compartment installation 120 is for example not configured to communicate directly with the system 100. It then makes use for example of a device configured for forwarding data in order to communicate with the system 100 and/or individual apparatuses 101, 102 of the system 100. The device configured for forwarding may for example exchange data with the system 100 via a remote communication interface and data with the compartment installation 120 via a close-range communication interface and thus forward data from the system 100 to the compartment installation 120 and vice versa.

By way of example, the system 100 constitutes a backend system comprising two servers 101, 102. In this case, the servers 101, 102 may communicate with one another, for example. In particular, each of the servers 101, 102 in this case fulfils different tasks, for example. In this regard, for example, server 101 manages one or more compartment installations 120, e.g. respective sites and state data, and server 102 manages for example registered users 111 of compartment installations 120 and e.g. the devices 110 thereof. In other embodiments, however, the system 100 may also be just one server 101, 102 and/or comprise more than two servers 101, 102, which may for example also be different physical units. In this case, the distribution of tasks between the servers 101, 102 may be arbitrarily combined or divided. The system 100 and/or one or more servers 101, 102 of the system may for example communicate with the device 110 of a user 111 and/or the compartment installation 120 via a or a respective communication connection 132, e.g. an Internet connection, by means of a or a respective communication interface 103.

In the embodiment described below, the device 110 is a smartphone 110 of a person 111, but in other embodiments it may be any other mobile apparatus. In the present case, the person 111 may use the smartphone 110 for example to register himself/herself as user 111, in particular as recipient 111 of shipments 140, for the compartment installation 120 or for a plurality of compartment installations and/or other services of an operator of one or more compartment installations. In this case, users may generally be understood to mean for example persons who use/want to use the compartment installation 120 for receiving and/or sending shipments (e.g. parcels, letters, meals, foodstuffs, etc.), and also deliverers who deliver such shipments into the compartment installation 120 or collect/want to collect them from the compartment installation 120. A user 111 may be a human or a machine, e.g. a vehicle, a robot or a drone, to mention just a few examples. In the present exemplary embodiment, the registration of a user 111, in particular recipient 111 of shipments 140, takes place by way of example by means of an app or interactive website on the smartphone 110. In the context of this registration, for example, the person 111 acquires a user identifier, for example by the latter being allocated to said person or said person choosing said user identifier. In the present embodiment, in the course of this registration, the smartphone 110 also generates a key, in the present case by way of example a public key of an asymmetric key pair and the associated private key of the asymmetric key pair. In other embodiments, however, this generating may also take place in a different context and comprise a different type of key, e.g. a symmetric key, which also for example is only acquired and not generated on the smartphone 110.

The smartphone 110 then communicates the key to the system 100, for example. In this case, the generated key—the public key in the present exemplary embodiment—may be associated with the user identifier of the user 111, e.g. by the smartphone 110 or the system 100. The system 100 is then configured for example to communicate not only the key to a compartment installation 120, but also the user identifier associated therewith. The communicating may take place for example immediately after the system 100 has acquired the key. The key is then communicated for example immediately to a plurality of compartment installations 120, e.g. to all compartment installations of a specific operator or all compartment installations in a specific region, e.g. an area around the place of residence of the user 111. Alternatively, the system 100 may also store the key, however, and communicate it to a compartment installation 120 for example only if e.g. a shipment 140 for the user 111 is, has been or is intended to be introduced there.

A shipment 140 may be introduced for example by a deliverer, e.g. a human or mechanical deliverer. For this purpose, the deliverer authenticates himself/herself/itself for example vis-à-vis the compartment installation 120 and scans for example the label 141 or other pieces of shipment information of the shipment 140 using the deliverer's device, which may for example communicate the captured pieces of information to the compartment installation 120, and/or holds the label 141 of the shipment 140 in front of a scanner of the compartment installation 120, such that the latter may scan the label 141 and thus acquire the pieces of shipment information of the shipment 140. Afterward, for example, a compartment 123 of the compartment installation is opened, into which compartment the shipment 140 may be introduced. As soon as the shipment 140 has been introduced, the compartment 123 is closed again, for example. The compartment installation 120 then generates for example access information for this compartment 123, for example on the basis of at least a random or pseudo-random value, and stores said access information. By way of example, it is assumed here that the access information 0x82C73 was generated for the compartment 123.

For example in the context of introducing, e.g. as a result of scanning the label 141, the compartment installation 120 acquires pieces of information about the shipment 140 that has been introduced or is to be introduced. In particular, the compartment installation 120 for example also acquires or captures a user identifier associated with the shipment 140, e.g. the user identifier of the recipient 111 of the shipment 140. On the basis of said user identifier, the compartment installation may for example request at the system 100 inherently the communicating of the key linked with the user identifier. Once the compartment installation 120 has then acquired said key (or if it had already previously acquired said key anyway and did not have to make a request at all, but rather only had to access the internal memory), it may use the key associated with said user identifier to encrypt the previously generated access information for the compartment 123 in which the shipment 140 for this user 111 is situated. In this case, in the present exemplary embodiment, it is assumed that only one key is associated with the user identifier. In other embodiments, however, it is entirely possible for a plurality of keys to be assigned to the same user identifier, for example one key per device, wherein a user 111 may have/register a plurality of devices 110.

By way of example, in the present exemplary embodiment, the deliverer additionally introduces a further shipment for the same recipient 111 into the compartment 121 and another shipment for another recipient into the compartment 122. The method effected for introducing here is by way of example in each case the same as that which has been or is described for the shipment 140 and compartment 123. In other embodiments, however, it is also possible to introduce only one shipment 140 for one recipient 111 and for example no further shipment into the same and/or a different compartment. In other embodiments, it is also possible to introduce only one or more shipments 140 for one recipient 111 and e.g. no shipments for other recipients. The method effected for introducing may also vary between embodiments or in an embodiment.

Since the compartment installation 120 may have a plurality of compartments 121, 122, 123 and the latter may contain a plurality of shipments for a plurality of recipients, it is advantageous if the compartment installation 120, e.g. upon an authentication request of a user 111, may ascertain the compartment 121, 122, 123 or the shipment 140 to which a user 111 desires access and what is the associated access information on the basis of which information which authorizes access may be created. For this purpose, the compartment installation 120 may for example associate an indicator with the access information. For example, the compartment installation 120 chooses as indicator the compartment number 123 of the compartment 123 into which the shipment 140 was introduced, and stores said indicator linked with the access information, e.g. as a data structure or as part of a data structure. In this regard, upon an authentication request at a later time, for example, on the basis of the indicator and the data stored by the compartment installation 120, the latter may ascertain the compartment 123 to which the request relates and what access information is crucial for this compartment 123. In the present exemplary embodiment, simply a compartment number was chosen as indicator, but in other exemplary embodiments the indicator may be chosen and associated completely differently, provided that it is still possible for the compartment installation 120 to determine the associated access information at least on the basis of the indicator and possibly further pieces of information.

The compartment installation 120 may subsequently output first data to the system 100, for example via the communication connection 130 or else via a device configured for forwarding data, e.g. the device of the deliverer that inserted the shipment 140 and still has a close-range radio communication connection to the compartment installation 120. The first data may comprise the access information encrypted with the key and the indicator and possibly further data or pieces of information, e.g. a shipment identifier of the shipment 140 and/or a user identifier, for example of a recipient 111. In this case, the indicator may for example likewise be encrypted with the key. The system 100 may then for example decrypt neither the access information encrypted with the key nor the indicator encrypted with the key. On the other hand, the system 100 for example already has the shipment identifier and/or the user identifier in plaintext. On the basis of the shipment identifier and/or the user identifier, the system 100 may then for example identify the user 111 and/or the latter's smartphone 110 and output or communicate second data to the smartphone 110. In this case, the second data comprise at least the access information encrypted with the key and the indicator possibly encrypted with the key. Furthermore, in some embodiments, however, the second data may contain even further pieces of information, e.g. the identifier of the compartment installation 120 into which the shipment 140 was introduced. The smartphone 110 may then indicate to the user 111 in an app, for example, that a shipment 140 is ready for the user to collect in the compartment installation 120. The user 111 then has for example the possibility of collecting the shipment 140 within a predetermined time period, e.g. 9 days, from the compartment installation 120.

In the present exemplary embodiment, the smartphone 110 has both the public key that was used to encrypt at least the access information contained in the second data, and the associated private key. Said smartphone is thus able to decrypt the access information contained in the second data and, if the indicator contained in the second data was likewise encrypted with the public key, said indicator, too, with the private key.

At least on the basis of the access information the smartphone 110 may then generate a code word. The generating may be performed for example in reaction to a user input. In this regard, for example, the user 111 may approach the compartment installation 120 in order to collect the shipment 140 intended for said user. Said user, in order to authenticate himself/herself vis-à-vis the compartment installation 120, may then open an app on his/her smartphone 110 or operate it in such a way that said app generates a code word. In other embodiments, however, the code word generating may for example also be triggered automatically, e.g. by virtue of the smartphone 110 recognizing that it is in proximity to the compartment installation 120, e.g. because it acquires Bluetooth Beacons from the compartment installation 120. In this case, the general method for generating a code word on the basis of at least access information may indeed be known and need not be kept secret in order to ensure the security of the method. Since only the smartphone 110 has the private key, in practice no other apparatus is able to decrypt the access information encrypted with the first key and to generate a corresponding code word on the basis of at least said access information. In the present exemplary embodiment, the code word is generated using a one-way function, in particular a hash function, wherein at least a portion of the access information and at least a portion of a time value are used as input data for the one-way function. In particular, as time value, for example, a UNIX time value rounded to 60 seconds, which represents the current time of day of the smartphone 110 in coordinated universal time (UTC), is used for generating the code word. The code word may then for example be automatically generated anew every 60 seconds when a new rounded time value is present. In other words, the exact time may be fixed differently from 60 seconds, for example at 30 or 90 seconds, for example as a configuration parameter that may be flexibly adapted, e.g. on the basis of practical experience. Overall, generating and checking the code word may be performed for example in accordance with a standard, for example the Oath standard.

After generating the code word, the smartphone 110 may for example display third data, comprising at least the code word and the indicator, as a barcode or QR code on its screen and thus provide the third data for the compartment installation 120. The user 111 may then for example hold the smartphone 110 in front of a capturing unit, e.g. a scanner, of the compartment installation 120 in such a way that the latter may capture the barcode or QR code. In other embodiments, the smartphone 110 may communicate the third data to the compartment installation 120 via a close-range radio communication connection, e.g. Bluetooth, and/or display the third data e.g. as (hexa)decimal values, such that the user 111 may input them at an input unit, e.g. a touch-sensitive screen, of the compartment installation 120.

In the present case, the indicator has by way of example the decimal value 123, which may be represented for example as 01111011 in bits. A hexadecimal representation is e.g. 0x7B. The code word may e.g. likewise be represented in bits. It is assumed here by way of example that the result of the one-way function, the input data of which were a rounded time value and the access information 0x82C73 for the compartment 123, was truncated after four places, such that in the present case by way of example the (by way of example very short) code word 9582 with four decimal digits is used. This code word reads e.g. 0010010101101110 in binary representation and e.g. 0x256E in hexadecimal representation. The third data may then comprise for example the hexadecimal sequence 0x2756BE, i.e. the first 4 bits (0x2) are code word bits, the following 4 bits (0x7) are indicator bits, the following 8 bits (0x56) are code word bits, the following 4 bits (0xB) are indicator bits and the last 4 bits (0xE) are code word bits. The code word and indicator bits, in third data, are e.g. always mixed according to this rule for example by the smartphone 110 and all other devices that would like to authenticate themselves vis-à-vis the compartment installation 120. The compartment installation 120 knows this rule for example and may easily divide the value 0x2756BE again into the values 0x7B for the indicator and 0x256E for the code word. The rule may, however, not be known for example to an attacker who would like to gain access to the compartment installation in an unauthorized manner and who spies out/intercepts the third data in the form 0x2756BE, with the result that said attacker cannot recognize which bits are indicator bits and which are code word bits. In other embodiments, the rule may also vary, for example depending on the time of day, a predetermination by the system 100 or other factors, e.g. the first bit of the code word.

On the basis of at least the indicator contained in the third data, the compartment installation 120 may determine access information after acquiring the third data. If the indicator has the value 123, this is therefore the access information 0x82C73 associated with this indicator. In the present exemplary embodiment, the compartment installation 120 thereupon generates three code words using the same method steps that the smartphone 110 used to generate the code word. The compartment installation 120 then generates a code word on the basis of the access information 0x82C73 and the current UNIX time value ($t_0$), rounded to 60 seconds, by way of example, a further code word on the basis of the access information 0x82C73 and the previous UNIX time value ($t_{-1}$) rounded to 60 seconds, and a further code word on the basis of the access information 0x82C73 and the next UNIX time value ($t_{+1}$) rounded to 60 seconds. The generated code words 0xBA23, 0x256E, 0x5506 then result, for example. The compartment installation 120 may thereupon compare each of the third code words with the code word 0x256E acquired in the third data and ascertain that the code word which it generated on the basis of the access information 0x82C73 and the previous UNIX time value ($t_{-1}$) rounded to 60 seconds, corresponds to the code word 0x256E contained in the third data. The temporal deviation may result for example from the fact that the current time value of the compartment installation 120 and the current time value of the smartphone 110 may be slightly different, e.g. because the compartment installation 120 is not connected to the Internet at the time of the authentication of the user 111. In the present case, the compartment installation 120 may then ascertain for example that the code word contained in the third data authorizes access to compartment 123 because there was a correspondence, and the compartment installation 120 may grant the user 111 access to compartment 123, e.g. by means of the compartment installation 120 unlocking the door to compartment 123. The compartment installation 120 may subsequently store the code word for which it ascertained that this code word authorizes access. A renewed attempt at authentication with the same code word within a predetermined duration, for example 3 minutes, 5 minutes or 120 minutes, may then be rejected by the compartment installation 120 without further checking, for example, in order to prevent an unauthorized person from intercepting a code word and using it anew. In other embodiments, however, more or fewer times values may also be used, which e.g. are also rounded differently and/or are in different relations to e.g. a current time value, that is to say that, for example, what is used is not or not just a current time value ($t_0$), a previous time value ($t_{-1}$) and a future time value ($t_{+1}$), but rather e.g. also one time value ($t_N$) or a plurality of time values ($t_N$), where N represents an arbitrary number. Time values ($t_A$) which do not depend relatively on another time value, e.g. a current time value ($t_0$), but rather are e.g. absolute time values, may also be used. How many and what time values are used is for example a configuration parameter that may be flexibly adapted, e.g. on the basis of practical experience.

In the present exemplary embodiment, the compartment installation 120 generates a plurality of code words in order to be able to ascertain whether the code word acquired in the third data authorizes access. In other embodiments, however, a plurality of other methods are implementable in order to be able to ascertain whether a code word contained in third data authorizes access. By way of example, on the basis of the code word contained in the third data, the compartment installation 120 may generate access information and check whether the latter corresponds to the access information of the affected compartment, here e.g. 0x82C73 of the compartment 123.

In the present exemplary embodiment, additionally or alternatively, instead of only ascertaining that the code word contained in the third data authorizes access to compartment 123, the compartment installation 120 might ascertain whether the code word authorizes access to further compartments of the compartment installation, e.g. the compartments 121, 122. By way of example, on the basis of pieces of information concerning the shipment 140 situated in the compartment 123, the compartment installation 120 may determine a user identifier, in particular the user identifier of the recipient 111 of the shipment 140. Proceeding therefrom, the compartment installation 120 may determine one or more further compartments 121, 122 in which are situated respective shipments that are likewise associated with the user identifier of this recipient 111. In the present exemplary embodiment, the deliverer introduced a shipment for the recipient 111 into the compartment 121 as well. The compartment installation 120 may therefore ascertain that the code word (simultaneously) also authorizes access to this compartment 121. Thus, the same code word, e.g. upon being input once or upon being acquired once, then authorizes access to the compartments 121, 123 of the compartment installation in which are situated respective shipments that are associated with the user identifier of the same recipient 111. This is advantageous for example insofar as it is not necessary that the compartment installation 120 must additionally acquire the user identifier, which may be e.g. a 6-12-digit post number, in order to be able to ascertain that a user is authorized to access a plurality of compartments 121, 123 and which compartments 121, 123 they are. The recipient 111, insofar as he/she is authorized to access a plurality of compartments 121, 123 after the code word has been input once, may for example select which compartment 121, 123 is actually intended to be opened. This selection may be performed for example via an input unit or user interface (e.g. a keyboard or a touch-sensitive screen with screen keyboard) of the compartment installation 120, or else on the mobile device 110 of the recipient 111, which communicates this selection to the compartment installation 120 via a wireless communication interface. In the present exemplary embodiment, the code word thus used, for example, after being used once, may be stored at the compartment installation 120 and/or disabled in some other way so that it does not authorize access anew.

Figure 2:
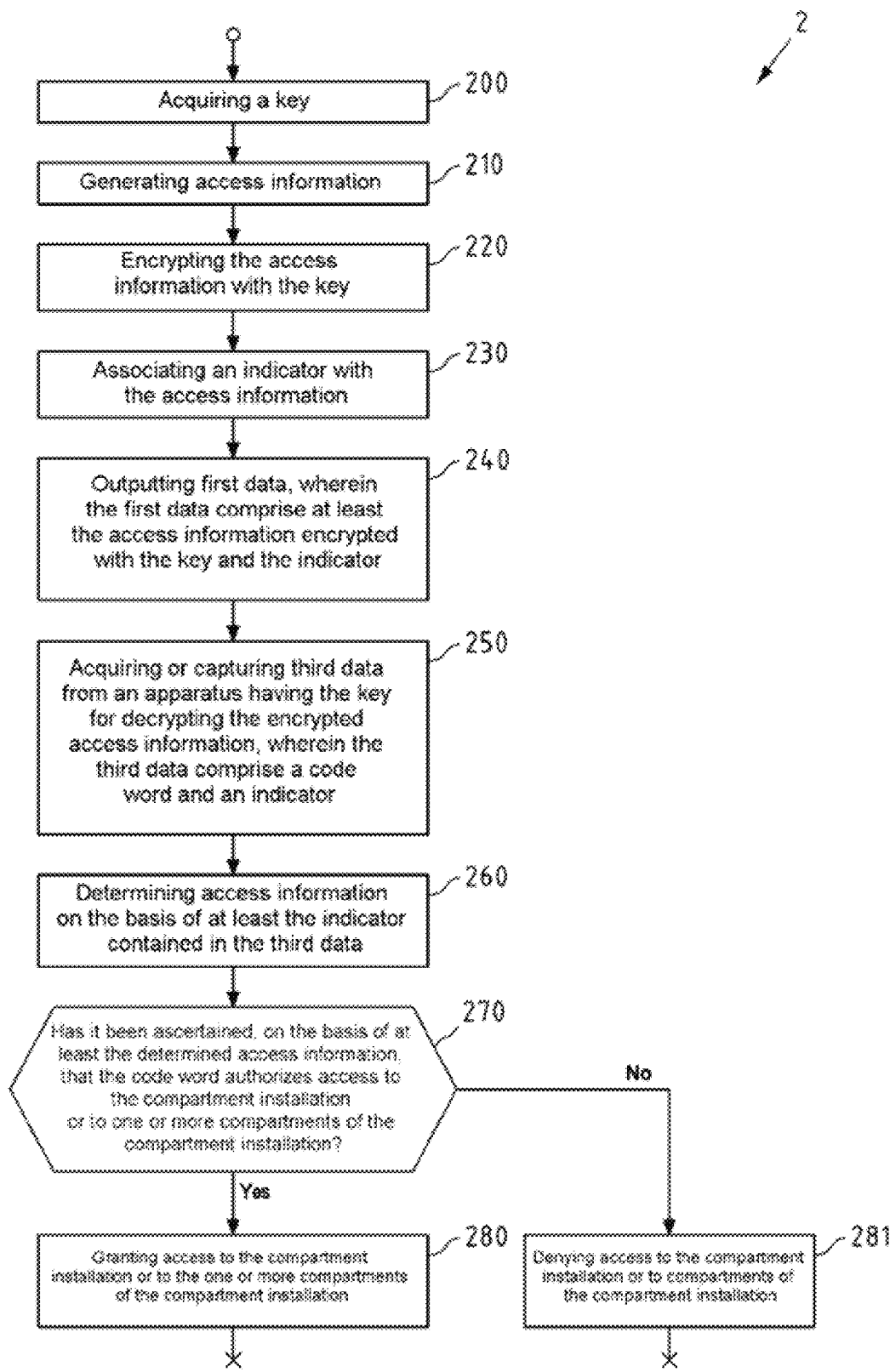
FIG. 2 shows a flow diagram of one exemplary embodiment of a method in accordance with the first aspect of the present invention, for example performed and/or controlled by a compartment installation.

FIG. 2 shows a flow diagram 2 of one exemplary embodiment of a method in accordance with the first aspect of the present invention. The method in the flow diagram 2 is performed and/or controlled for example by a compartment installation, e.g. the compartment installation 120 from the system 1, or a system at least comprising a compartment installation, e.g. a system comprising the compartment installation 120 and the device of a deliverer and/or the system 100.

In step 200, a key is acquired, e.g. a symmetric key or an asymmetric key, in particular a public key of an asymmetric key pair. For this exemplary embodiment, it is assumed by way of example that the key is a symmetric key.

In step 210, access information is generated. The access information may have been or be associated e.g. with a compartment into which a shipment was, is or is intended to be introduced. Alternatively, however, the access information may also be generated in order to enable access to the compartment installation or one or more user circles with in each case a predefined function independently of a shipment. For example, the access information may be generated in order to enable access to the compartment installation for deliverers. The access information may then be generated anew for example regularly, e.g. every 24 hours, every 7 days or every month, in order to make a brute force attack more difficult. By way of example, it is assumed here that access information with the decimal representation "23140896" was generated in the present case.

In step 220, the access information is encrypted with the key, e.g. in order to prevent unauthorized persons from acquiring access to the access information.

In step 230, an indicator is associated with the access information. This may be done for example in such a way that the compartment installation, on the basis of at least the indicator, may determine a user circle with a predefined function, that is to say that e.g. the indicator "150" is associated with the user circle "deliverers" or is assigned thereto. Users of this user circle with this function are then intended to be able to generate, on the basis of at least the access information, for example, a code word which authorizes access to the compartment installation, that is to say e.g. to all compartments, to an arbitrary compartment, to a special compartment, to a (special) functionality, e.g. a special program suitable for the function, or to the controller of the compartment installation.

In step 240, first data are output, wherein the first data comprise at least the access information encrypted with the key and the indicator. The data are output to a server 101, 102 or a system 100, for example.

In step 250, e.g. at a later time and/or e.g. if a user of the user circle "deliverers" is in proximity to the compartment installation, third data are acquired or captured from an apparatus having the key for decrypting the encrypted access information, wherein the third data comprise a code word and an indicator. The apparatus may be, by way of example, the mobile device of a deliverer, which communicates with the compartment installation via Bluetooth, for example. Alternatively, the deliverer's device may for example also optically represent the third data and the compartment installation may capture them.

In step 260, access information is determined on the basis of at least the indicator contained in the third data. By way of example, in the present case, the user circle "deliverers" and the access information "23140896" assigned thereto are determined at least on the basis of the indicator "150".

Step 270 involves ascertaining, on the basis of at least the determined access information, whether the code word authorizes access to the compartment installation or to one or more compartments of the compartment installation. By way of example, the compartment installation decrypts the code word contained in the third data with the symmetric key acquired and checks whether the decrypted code word contains information corresponding to the access information "23140896". If that is the case, the compartment installation ascertains for example that the code word authorizes access to the compartment installation, e.g. to all compartments or to all empty compartments of the compartment installation, in particular because it has already been ascertained that the indicator contained in the third data is associated with the user circle "deliverers".

If it has been ascertained that the code word authorizes access to the compartment installation or to one or more compartments of the compartment installation, access to the compartment installation or to the one or more compartments of the compartment installation is granted in step 280. If it has been ascertained that the code word does not authorize access to the compartment installation or to one or more compartments of the compartment installation, access to the compartment installation or to compartments of the compartment installation is denied in step 281.

Figure 3:
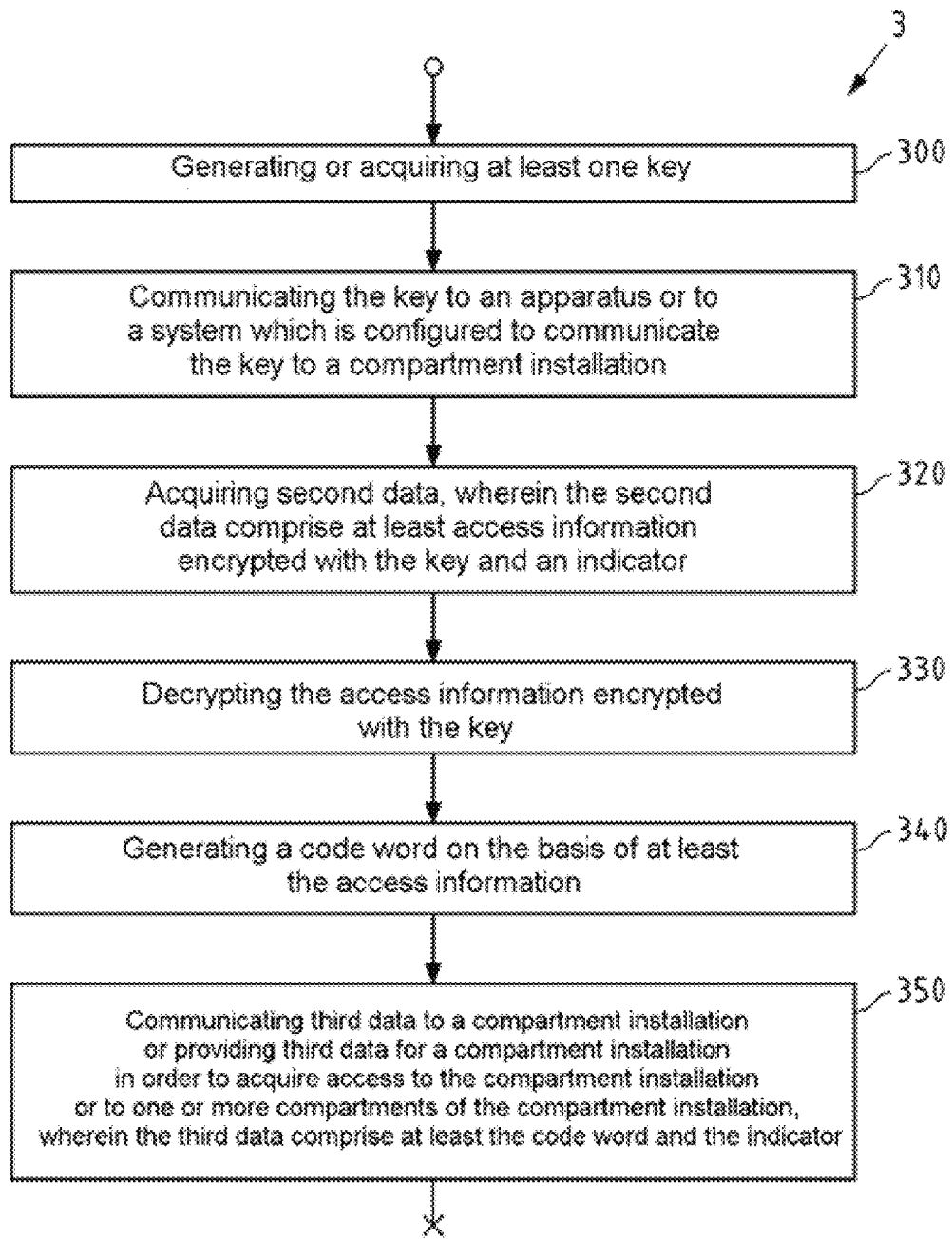
FIG. 3 shows a flow diagram of one exemplary embodiment of a method in accordance with the second aspect of the present invention, for example performed and/or controlled by a mobile apparatus.

FIG. 3 shows a flow diagram 3 of one exemplary embodiment of a method in accordance with the second aspect of the present invention. The method in the flow diagram 3 is performed and/or controlled for example by a mobile apparatus, e.g. the smartphone 110 from the system 1 or the device of a deliverer.

In step 300, at least one key is generated or acquired. This may be done for example in reaction to and/or by way of a user input and/or a notification, e.g. of the system 100.

In step 310, the key is communicated to an apparatus or to a system which is configured to communicate the key to a compartment installation. In particular, the key is communicated e.g. to the system 100 from FIG. 1.

In step 320, second data are acquired, wherein the second data comprise at least access information encrypted with the key and an indicator. The second data are acquired for example while the apparatus that acquires the second data is in principle—with the exception of coincidences—not in proximity to a compartment installation.

In step 330, the access information encrypted with the key is decrypted, for example after the process of acquiring or in reaction to the process of acquiring the second data.

In step 340, a code word is generated on the basis of at least the access information. However, it is also possible for example for a plurality of code words to be generated on the basis of at least the access information. The generating of the code word may for example be triggered by a user input by a user at the apparatus generating the code word and/or take place at regular time intervals if the user operates the mobile apparatus in a certain way, e.g. by means of the user calling up an app and selecting a shipment and/or a compartment installation which is represented in the app, and/or opening a predetermined view in the app and/or leaving it in the foreground.

In step 350, third data are communicated to a compartment installation or provided for a compartment installation in order to acquire access to the compartment installation or to one or more compartments of the compartment installation, wherein the third data comprise at least the code word and the indicator. This may take place for example only if the communicating apparatus or an entity that knows the third data is in proximity to the compartment installation, that is to say is for example at a distance of less than an arm length, or in a radius of e.g. 5 m.

Figure 4:
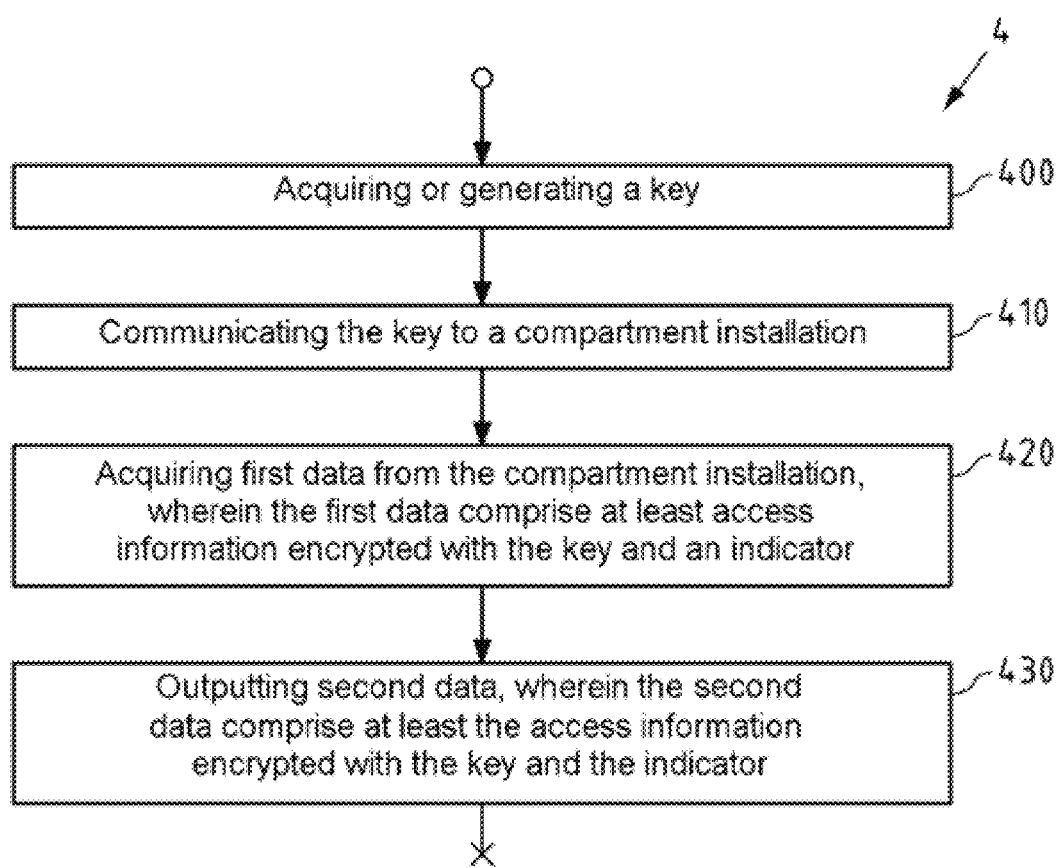
FIG. 4 shows a flow diagram of one exemplary embodiment of a method in accordance with the third aspect of the present invention, for example performed and/or controlled by a backend system and/or server.

FIG. 4 shows a flow diagram 4 of one exemplary embodiment of a method in accordance with the third aspect of the present invention. The method in the flow diagram 4 is performed and/or controlled for example by a system, e.g. the system 100 from the system 1, a single server, e.g. server 101, 102, or some other apparatus, e.g. the device of a deliverer.

In step 400, a key is acquired from a mobile apparatus, e.g. from the smartphone 110 in system 1.

Afterward—for example as soon as a communication connection 130 to a compartment installation 120 is available and/or in reaction to a request from the compartment installation 120 and/or in reaction to a request from a deliverer or the device of a deliverer and/or in reaction to a request from some other mobile apparatus of a user, e.g. a smartphone 110—in step 410 the key is communicated to a compartment installation, e.g. the compartment installation 120.

In step 420, first data are acquired from the compartment installation, wherein the first data comprise at least access information encrypted with the key and an indicator. In particular, the acquiring apparatus is for example not able to decrypt the access information encrypted with the key, e.g. because it cannot access a key required for the decryption.

In step 430, second data are output/communicated to the mobile apparatus, wherein the second data comprise at least the access information encrypted with the key and the indicator. This takes place for example as soon as a communication connection 132 to a mobile apparatus 110 is available and/or in reaction to a request from the compartment installation 120 and/or in reaction to a request from a deliverer or the device of a deliverer and/or in reaction to a request from the mobile apparatus 110 itself.

Figure 5:
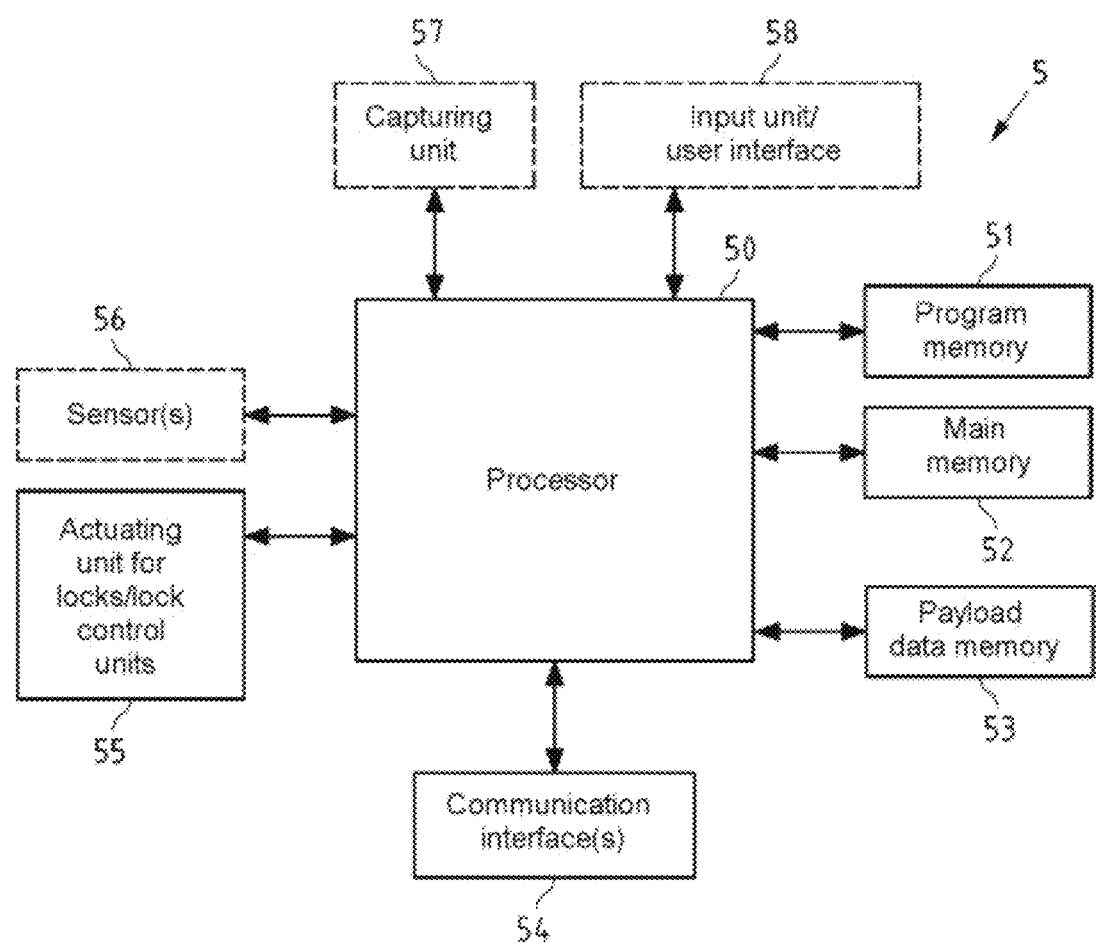
FIG. 5 shows a schematic illustration of one exemplary embodiment of an apparatus in accordance with the first aspect of the invention, for example a compartment installation.

FIG. 5 is a schematic illustration of one exemplary embodiment of an apparatus 5 in accordance with the first aspect of the invention. The apparatus 5 may represent for example a compartment installation 120 (see FIG. 1) or the control unit thereof.

The apparatus 5 comprises a processor 50, a program memory 51, a main memory 52, a payload data memory 53, one or more communication interface(s) 54, an actuating unit 55 for the locks or lock control units of the compartments of the compartment installation, one or more optional sensors 56, an optional capturing unit 57 and an optional input unit/user interface 58. The processor 50 executes for example a program in accordance with the first aspect of the invention, which program is stored in the program memory 51, for example as firmware. Main memory 52 serves in particular for storing temporary data while this program is running.

The payload data memory 53 serves for storing data required during the processing of the program. In the present case, said data may be for example the acquired key. Further data such as, for example, pieces of access information, indicators and code words may also be stored for example in the payload data memory 53, e.g. in data structures that also represent an assignment of pieces of access information to respective indicators and/or respective compartments.

The communication interface(s) 54 comprises/comprise for example an interface for wireless communication with the devices 6 and/or 7, for example by means of optical transmission and/or by means of communication based on electrical, magnetic or electromagnetic signals or fields, in particular on Bluetooth, NFC and/or RFID (Radio Frequency Identification). The apparatus 5 (and hence the compartment installation 120) is for example furthermore configured for direct communication with the apparatus 7 (and hence the system 100), that is to say has for example a communication interface enabling access to the Internet or to some other network to which the apparatus 7 is connected.

The actuating unit 55 enables an individual compartment of the compartment installation to be opened or unlocked in a targeted manner in order to enable the opening, in particular by means of the actuating of the lock of the compartment or a lock control unit of the compartment. Additionally or alternatively, the locking of a compartment may be caused. The actuating unit 55, via a respective wiring, for example, is connected to all locks or lock control units of the compartment installation or is connected to a bus to which all locks or lock control units of the compartment installation are also linked.

The sensors 56 are optional and compartment-specific, for example. One sensor makes it possible for example to detect whether there is a respective shipment in a respective compartment and/or whether a shipment is/was introduced into the compartment and/or removed therefrom. The same sensor or a further sensor enables e.g. the capturing of pieces of information of a shipment 140, for example by optically scanning a label 141 or reading an NFC tag associated with the shipment 140.

The capturing unit 57 is optional and, in one exemplary embodiment, a scanner that may optically capture pieces of information, e.g. a barcode or QR code from a screen of a mobile apparatus 6. In a further exemplary embodiment, the capturing unit 57 is configured to read NFC tags which for example are attached to a respective shipment 140 and/or are inserted into the latter. The capturing unit 57 may additionally or alternatively be able to capture acoustic signals and to process them, that is to say e.g. by means of speech recognition.

The input unit/user interface 58 is optional and configured for communication with a deliverer/delivery entity and/or the user 111. This may comprise for example an output unit for displaying (e.g. via a screen or via compartment-specific luminous displays (e.g. for representing a respective state occupied/unoccupied)) or acoustically outputting pieces of information and/or a unit for acquiring pieces of information and/or data (e.g. a keyboard or a touch-sensitive screen with screen keyboard or a speech recognition module) from the persons.

Figure 6:
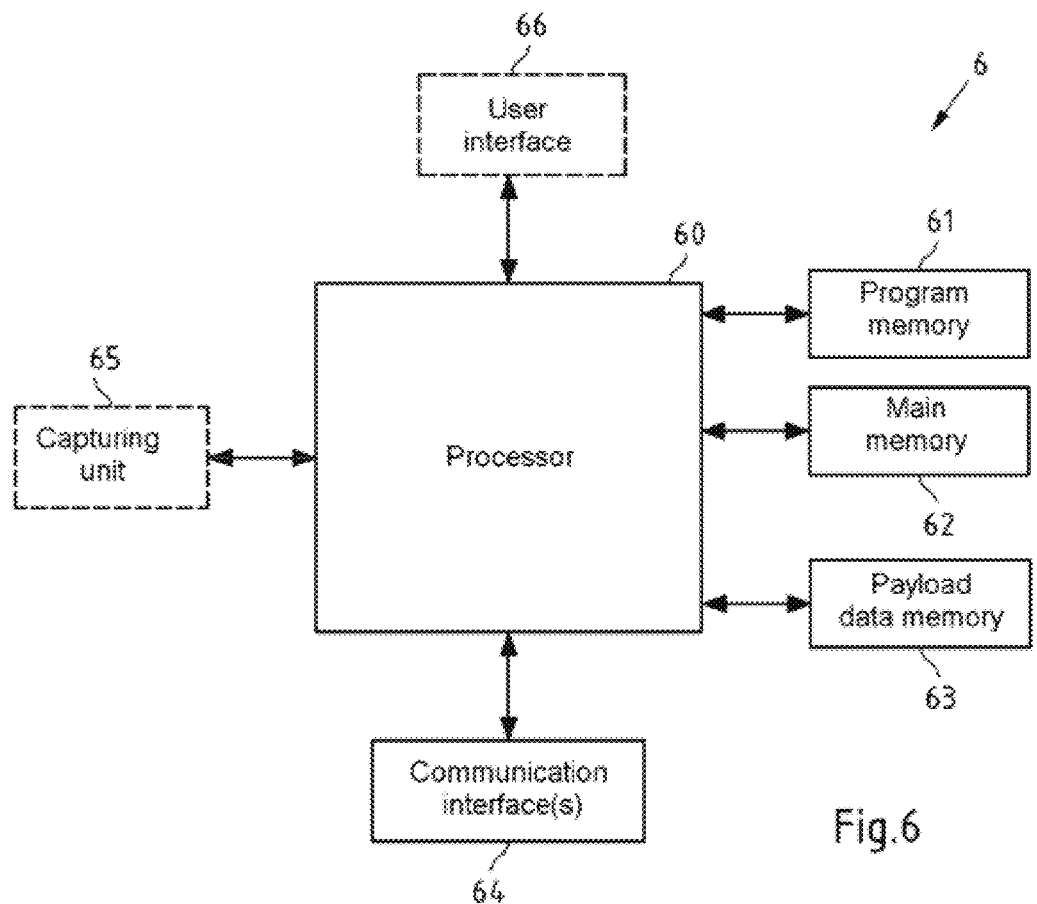
FIG. 6 shows a schematic illustration of one exemplary embodiment of an apparatus in accordance with the second aspect of the invention, for example a mobile apparatus.

FIG. 6 is a schematic illustration of one exemplary embodiment of an apparatus 6 in accordance with the second aspect of the invention. The apparatus 6 may constitute for example a portable scanning device of a deliverer/delivery entity (a so-called handheld scanner), that is to say a device configured for optically acquiring shipment or consignment data, in particular in the form of 2D or 3D barcodes, from the shipment or consignment. If the apparatus 6 represents the device 110 of the user 111, this may be in particular a smartphone, that is to say in particular a mobile telephone having the ability to independently execute even relatively complex programs, so-called apps.

The apparatus 6 comprises a processor 60, a program memory 61, a main memory 62, a payload data memory 63, one or more communication interface(s) 64, an optional capturing unit 65 for capturing shipment or consignment data and an optical user interface 66.

The processor 60 executes for example a program in accordance with the second aspect of the invention, which program is stored in the program memory 61, for example as an app or as firmware. Main memory 62 serves in particular for storing temporary data while this program is running.

The payload data memory 63 serves for storing data required during the processing of the program, for example one or more keys, pieces of access information, indicators and code words.

The communication interface(s) 64 comprise(s) one or more interfaces for communication of the apparatus with the system 100 and/or the apparatus 7. The interface may be based on IP, for example, but on account of the portability of the apparatus 6 may make use of a wireless transmission technique as physical layer, based for example on cellular mobile radio (e.g. GSM, E-GSM, UMTS, LTE, 5G) or a WLAN (Wireless Local Area Network). The communication interface(s) 64 optionally furthermore comprise(s) an interface for communication with the compartment installation 120, for example on the basis of optical transmission, Bluetooth or NFC. Here a transmission technique with a comparatively small range, for example less than 100 m or 10 m or 5 m, may be sufficient and possibly even desirable in order to make it difficult for third parties to intercept the transmission.

The user interface 66 may be configured as a screen and keyboard or as a touch-sensitive screen (touchscreen), optionally with additional acoustic and/or haptic signaling units. The display of third data via the user interface 66 may obviate the need for a separate interface 64 for communication with the compartment installation 120 if the access authorization information may be input into a user interface of the compartment installation 120 (see user interface 58 in FIG. 5). The capturing unit 65 for capturing shipment or consignment data (for example in the form of an optical scanning unit) is present for example only if the device is the device of a deliverer/delivery entity, but in particular not if the device is a smartphone 110 of a recipient 111 of a shipment.

Figure 7:
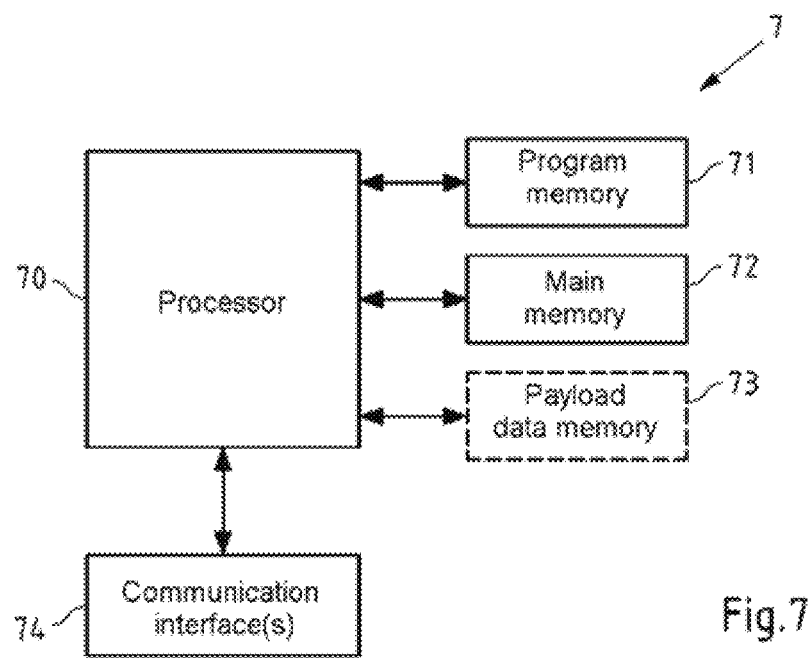
FIG. 7 shows a schematic illustration of one exemplary embodiment of an apparatus in accordance with the third aspect of the invention, for example a server.

FIG. 7 is a schematic illustration of one exemplary embodiment of an apparatus 7 in accordance with the third aspect of the invention. The apparatus 7 may represent for example the entire system 100 or the respective units of the system 100, in particular the compartment installation management server 101 and the user data management server 102.

The apparatus 7 comprises a processor 70, a program memory 71, a main memory 72, an optional payload data memory 73 and also one or more communication interface(s) 74. The processor executes for example a program in accordance with the third aspect of the invention, which program is stored in the program memory 71, for example as firmware. Main memory 72 serves in particular for storing temporary data while this program is running.

The payload data memory 73 serves for storing data required during the processing of the program. In the present case, said data may be for example keys acquired and to be communicated and other pieces of information, e.g. pieces of access information encrypted with respective keys and indicators, but also user identifiers, user contact data, such as email addresses, and mobile radio numbers, compartment installation identifiers and shipment data. However, the keys acquired and to be communicated may for example also only be temporarily stored in the main memory 72 and be erased again immediately after having been communicated. An exemplary apparatus 7 that merely forwards data then does not necessarily require a payload data memory 73.

The communication interface(s) 74 may comprise at least one interface for communication with other units of the system 1, of the system 100 and/or with the device 110. This communication may be based on the Internet Protocol (IP) for example. By way of example, for this purpose, at least one of the communication interface(s) 74 is embodied as a Local Area Network (LAN) interface.

In the exemplary embodiments in FIGS. 5-7, the processor may be for example in each case a control unit, a microprocessor, a microcontrol unit such as a microcontroller, a digital signal processor (DSP), an application-specific integrated circuit (ASIC) or a field programmable gate array (FPGA). In the exemplary embodiments in FIGS. 5-7, the program memory and/or the payload data memory may be for example a persistent memory, such as a read only memory (ROM), for example. The program memory may for example be fixedly connected to the respective processor, but may alternatively also be releasably connected to the respective processor, for example as a memory card, a floppy disk or an optical data carrier medium (e.g. a CD or DVD). The main memory of the exemplary embodiments in FIGS. 5-7 is used for example for storing temporary results during the processing of the program instructions, and is for example a volatile memory, such as a random access memory (RAM), for example.

Figure 8:
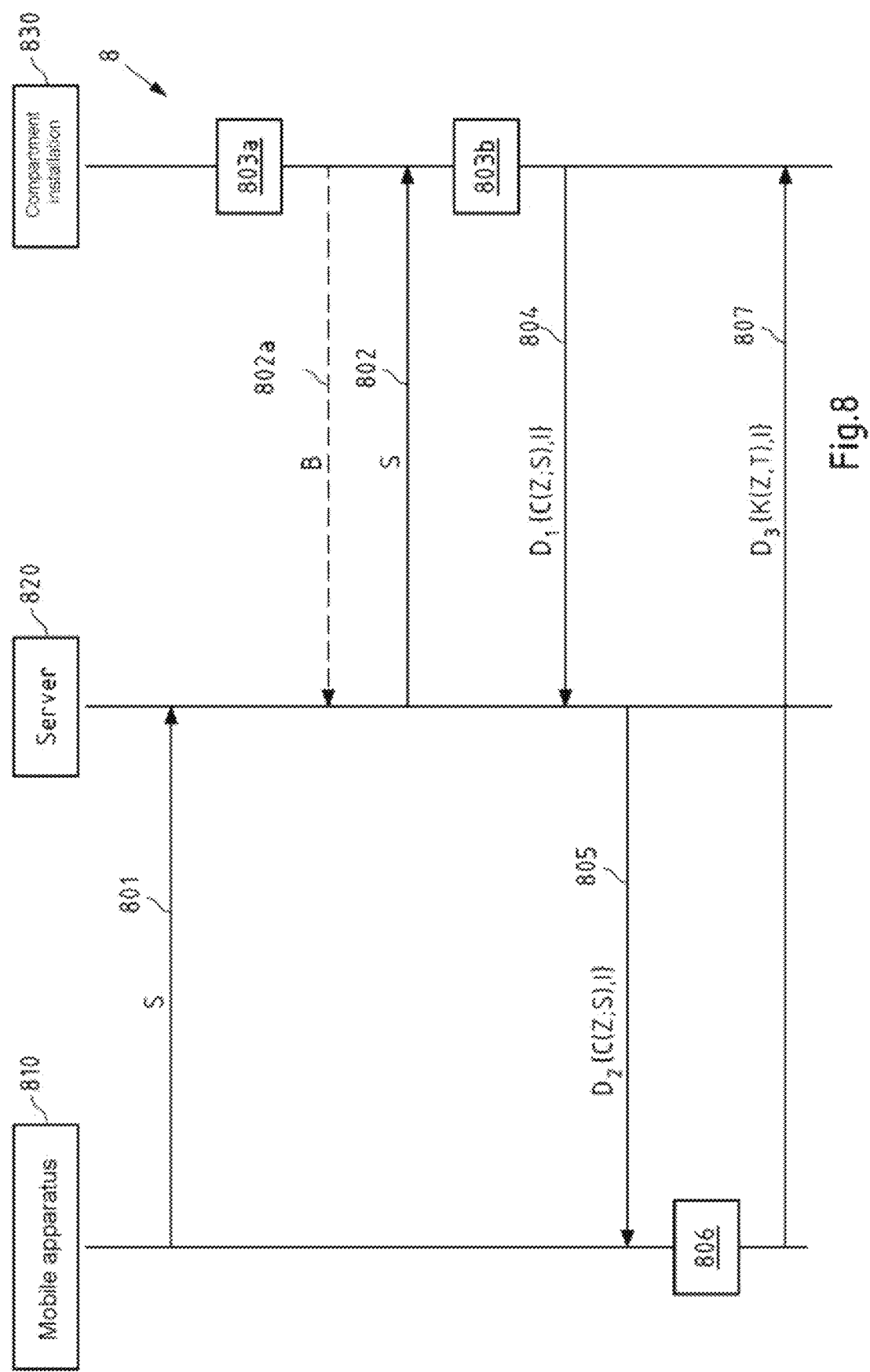
FIG. 8 shows a schematic illustration of exemplary data transmissions between apparatuses, in particular between an exemplary mobile apparatus, an exemplary server and an exemplary compartment installation, which each perform exemplary embodiments of methods in accordance with a respective aspect of the invention.

FIG. 8 shows a schematic illustration of exemplary data transmissions 8 between apparatuses that perform exemplary embodiments of methods in accordance with a respective aspect of the invention.

The mobile apparatus 810 performs for example the method in accordance with the second aspect of the invention. The mobile apparatus 810 represents for example the smartphone 110 of the system 1 and/or the apparatus 6.

The server 820 performs for example the method in accordance with the third aspect of the invention. The server 820 represents for example the system 100 of the system 1 and/or the apparatus 7.

The compartment installation 830 performs for example the method in accordance with the first aspect of the invention. The compartment installation 830 represents for example the compartment installation 120 of the system 1 and/or the apparatus 5.

After the mobile apparatus 810 has generated the key S, it communicates said key to the server 820 in step 801. The server 820 forwards the key S to the compartment installation 830 in step 802. In one exemplary embodiment, this is done in response to a request 802*a* from the compartment installation 830, for example a request which the compartment installation 830 sends to the server 820 for a key S associated with the user identifier B, by way of example. This request 802*a* may in turn have been triggered for example by an event 803*a*, for example the introducing of a shipment for the recipient having the user identifier B into a compartment of the compartment installation. In other embodiments or in other situations, the request 802*a* and/or the event 803*a* may be omitted and the server 820 makes available to the compartment installation 830 the key S, e.g. together with the associated user identifier B, in a step 802, e.g. before or independently of whether a shipment for the recipient having the user identifier B has been introduced into a compartment of the compartment installation 830.

If then at a later time, for example, a shipment is introduced in a compartment of the compartment installation 830, e.g. marked by the event 803*b* in FIG. 8, as a result the steps of generating the access information Z, encrypting the access information Z, associating an indicator I and outputting 804 first data $D_1$ may be triggered (cf. steps 210, 220, 230, 240 in FIG. 2). In this case, the first data $D_1$ comprise at least the access information Z encrypted with the key S (noted as C(Z;S) in FIG. 8) and the indicator I. After acquiring the first data $D_1$, the server 820 may perform outputting/communicating 805 of second data $D_2$ to the mobile apparatus 810. In this case, the second data $D_2$ also comprise at least C(Z;S) and the indicator I.

The mobile apparatus 810 may then decrypt C(Z;S) (and thus acquire the access information Z) and in association with an event 806, e.g. in reaction to the event 806, at least on the basis of the access information Z, generate a code word K (cf. steps 330, 340 in FIG. 3). In the present exemplary embodiment, by way of example, the access information is generated on the basis of, furthermore, a time value T. The event 806 may be e.g. a user input or the ascertaining by the mobile apparatus 810 that it is in proximity to the compartment installation 830. The mobile apparatus 810 subsequently performs the communicating 807 of third data $D_3$ to the compartment installation 830 or provides the third data $D_3$, such that a user may input them at the compartment installation 830. In this case, the third data $D_3$ comprise at least the code word K(Z,T) generated on the basis of at least the access information Z and the time value T, by way of example, and the indicator I. After acquiring the third data $D_3$, the compartment installation 830 may check whether the third data $D_3$ authorize access (cf. steps 260, 270, 280, 281 in FIG. 2 and possible supplementary steps that have been described e.g. in association with FIG. 1).

For all of the exemplary data transmissions 8 it holds true here that a transmission represented by an arrow, e.g. 804, but likewise also 801, 802a, 802, 805 or 807, represents either the communicating in one unit, e.g. a packet of a communication protocol, or the communicating in a plurality of units, e.g. also separate from one another, e.g. a plurality of packets of one or more respective communication protocols. A respective communicating may for example also take place in an encrypted manner, that is to say in particular e.g. with an encryption over and above the encryption with the key S. Further respective processing steps are also possible, e.g. entropy encoding or e.g. encoding by means of a Forward Error Correction (FEC) code. This may involve for example encryption and/or processing in accordance with encryption and/or processing that are/is customary for a respective communication protocol, e.g. Bluetooth, WLAN, 4G or 5G. However, unusual and/or additional encryptions and/or processings for respective transmissions are also possible.

Figure 9:
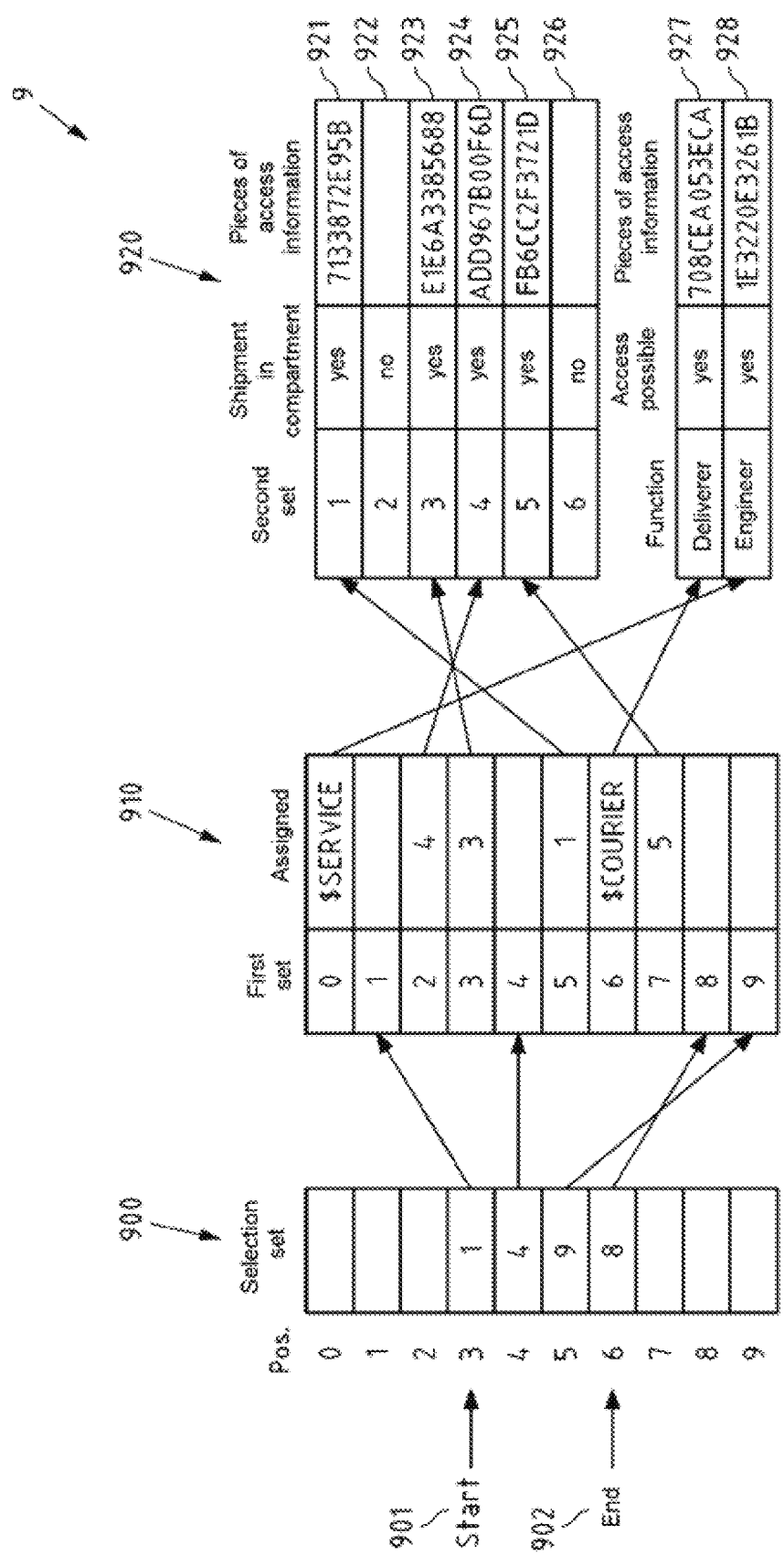
FIG. 9 shows a schematic illustration of an exemplary assignment of indicators, for example managed by a compartment installation, in accordance with one exemplary embodiment of a method in accordance with all aspects of the invention.

FIG. 9 shows a schematic illustration of an exemplary assignment 9 of indicators in accordance with one exemplary embodiment of a method in accordance with all aspects of the invention. In this case, FIG. 9 shows in particular an alternative to choosing the indicator and associating the indicator in the way that was described for the exemplary embodiment in FIG. 1. In that case simply a maximum number was chosen as indicator. The exemplary embodiment described below with respect to FIG. 9 is intended, however, in particular also to be understood in a manner detached from the other features of the embodiments described above, that is to say in particular in relation not just to compartments of a compartment installation, but rather to an arbitrary plurality of objects which may experience a state change (as occurs here by way of example in the case of a compartment as a result of a shipment being introduced) and which are or are not intended to be associated with an indicator depending on their state.

The exemplary assignment 9 shows a selection set 900, a first assignment table 910 and a second assignment table 920.

The second assignment table 920 is subdivided into two halves, wherein the upper half shows by way of example assignments of elements of a second set to respective pieces of access information in the rows 921-926, and wherein the lower half shows assignments of functions to respective pieces of access information in the rows 927, 928.

In the present exemplary embodiment, a compartment installation having six compartments is assumed by way of example. Each of the compartments is assigned to a respective element of the second set. Shipments are situated in some compartments. This is shown by way of example in the rows 921, 923, 924, 925. No shipments are situated in the compartments of the rows 922, 926. It is evident from the rows 921-926 that access information is assigned to an element of the second set only if at least one shipment is situated in the respective compartment. In particular, therefore, no respective pieces of access information are assigned to the elements 2 and 6 of the second set.

Each element of the second set which is assigned to a compartment of the compartment installation in which a respective shipment is situated is assigned to an element of the first set, that is to say in particular the elements 1, 3, 4 and 5 in the rows 921, 923, 924 and 925. In the present case, by way of example, the first set contains the elements 0-9, that is to say a total of 10 elements and thus more elements than the second set. The element 2 of the first set is assigned to the element 4 of the second set, the element 3 of the first set is assigned to the element 3 of the second set, the element 5 of the first set is assigned to the element 1 of the second set, and the element 7 of the first set is assigned to the element 5 of the second set. An indicator represented by one of the elements 2, 3, 5 or 7 of the first set is thus uniquely assigned to an element from the second set, a compartment of the compartment installation and access information. The compartment installation may thus determine the access information FB6CC2F37721D for example on the basis of an indicator with the value 7. On the basis of an indicator with the value 1, the compartment installation may ascertain for example that the indicator is not assigned and an access request containing this indicator is therefore impermissible.

In the present exemplary embodiment, it is assumed by way of example that two user circles with a respective function, that is to say a special role, were defined, for which access to the compartment installation is intended to be made possible. One user circle is deliverers (cf. 927) and the other user circle is engineers (cf. 928). In the present case, only the fact that access is possible is stored for each of these. In other exemplary embodiments, it is moreover possible, however, for further pieces of information to be stored as well, for example the extent to which access is possible in each case. The user circle with the function engineers is assigned by way of example to the element 0 of the first set in the present case, and the user circle with the function deliverers is assigned by way of example to the element 6 of the first set in the present case. Thus, on the basis of an indicator with the value 6, for example, the compartment installation may determine the access information 708CEA053ECA and ascertain that a request with this indicator does not just concern access for collecting one shipment from one compartment, but rather concerns for example access to the entire compartment installation and/or to a plurality of compartments into which a deliverer may introduce respective shipments.

Since the first set comprises more elements than the second set and the additional functions added together, there are for example always some, albeit changing, elements of the first set that are not assigned. In the present case, by way of example, the elements 1, 4, 8 and 9 of the first set are not assigned. If then, by way of example, a shipment is introduced into the compartment which is assigned to the element 2 of the second set (cf. 922), the compartment installation generates for example associated access information and assigns an element of the first set to the element 2 of the second set. The selection as to which element of the first set is intended to be assigned may be effected on the basis of a selection set 900, for example. The selection set 900 serves for example to avoid having to search through the first set for a free element when a free element of the first set is required. By way of example, the element 1 of the selection set 900, to which element the sight pointer 901 points, may be selected and assigned to the element 2 of the second set. Afterward, for example, the sight pointer is directed at position 4 of the selection set. If an assignment to an element of the first set is then triggered, by way of example to the element 3, this element is included in the selection set 900. In particular, by way of example, the end pointer 902 is incremented by one position, such that it points at the position 7. The element 3 may then be included in the selection set at this location. If such a First in, First out (FIFO) principle is applied, that element of the first set which is selected next is automatically always an element which has not been utilized for the longest time. Initially, when all the elements of the first set are in the selection set, for example a Fisher-Yates algorithm may be applied to the selection set in order that the elements of the first set are used or assigned in pseudo-random order.

The assignments illustrated in the tables 900, 910 and 920 are understood merely to be illustrations of a possible assignment. In various embodiments, these assignments may indeed be represented in totally other and different ways, e.g. in different data structures and/or in different memories; in particular, such tables need not (but may) be present physically in the memory. The order of operations described in the context of this exemplary embodiment may also be different. Furthermore, in some embodiments, only specific portions of the exemplary assignment 9 may be present. In this regard, for example, there is in no way an obligation stipulating the mandatory presence of a selection set 900 and the principle according to which said selection set is ordered or the principle according to which said selection set is accessed. Moreover, the presence of user circles with predefined functions, as shown in the rows 927, 928, is not a necessary requirement, for example. Finally, the indicator also need not be a value from a first set, but rather may be a value which is first compiled by the compartment installation and which results from different input data.

The embodiments/exemplary embodiments of the present invention that are described in this specification should also be understood to be disclosed in all combinations with one another. In particular, the description of a feature that an embodiment comprises should also not—unless explicitly explained to the contrary—be understood in the present case to mean that the feature is indispensable or essential for the function of the exemplary embodiment. The sequence of the method steps outlined in this specification in the individual flow diagrams is not mandatory; alternative sequences of the method steps are conceivable. The method steps may be implemented in various ways, and so implementation using software (through program instructions), hardware or a combination of the two is conceivable for implementing the method steps. Terms used in the patent claims such as "comprise", "have", "include", "contain" and the like do not exclude further elements or steps. The wording "at least partly" encompasses both the case "partly" and the case "completely". The wording "and/or" should be understood to the effect that both the alternative and the combination are intended to be disclosed, that is to say "A and/or B" means "(A) or (B) or (A and B)". In the context of this specification, a plurality of units, persons or the like means two or more units, persons or the like. The use of the indefinite article does not exclude a plurality. A single device may perform the functions of a plurality of units or devices mentioned in the patent claims. Reference signs indicated in the patent claims should not be regarded as limitations for the means and steps used.

The following example embodiments of the invention shall also be considered to be disclosed:

Embodiment 1

Method, for example performed by a compartment installation (830) or a system comprising a compartment installation (830), the method comprising
Acquiring a key (S);
Generating access information (Z);
Encrypting the access information (Z) with the key (S);
Associating an indicator (I) with the access information (Z);
Outputting first data ($D_1$), wherein the first data ($D_1$) comprise at least the access information (C(Z;S)) encrypted with the key (S) and the indicator (I);
Acquiring or capturing third data ($D_3$) from an apparatus having a key for decrypting the encrypted access information C(Z;S), wherein the third data ($D_3$) comprise a code word (K) and an indicator (I);
Determining access information (Z) on the basis of at least the indicator (I) contained in the third data ($D_3$);
Ascertaining, on the basis of at least the determined access information (Z), whether the code word authorizes access to the compartment installation (830) or to one or more compartments (121, 122, 123) of the compartment installation (830); and
Granting access to the compartment installation (830) or to one or more compartments (121, 122, 123) of the compartment installation (830), wherein a necessary condition for granting access is that it was ascertained that the code word (K) authorizes access to the compartment installation (830) or access to the one or more compartments (121, 122, 123) of the compartment installation (830).

Embodiment 2

Method according to Embodiment 1, wherein first data ($D_1$) are output to an apparatus (820) or to a system which is configured to communicate data to the apparatus (810) having a key for decrypting the encrypted access information (C(Z;S)).

Embodiment 3

Method according to either of the preceding embodiments, wherein the code word (K) only authorizes access to compartments (121, 122, 123) of the compartment installation (830) in which respective shipments associated with an identical user identifier are situated, wherein the method furthermore comprises one or more of the following method steps:
Determining a compartment (123) with which the indicator (I) contained in the third data ($D_3$) is associated;
Determining the user identifier on the basis of information concerning a shipment (140) situated in the determined compartment (123), wherein the user identifier is for example the user identifier of a recipient (111) of the shipment (140);
Determining one or more further compartments (121, 122) in which respective shipments associated with the determined user identifier are situated.

Embodiment 4

Method according to any of the preceding embodiments, wherein a necessary condition for ascertaining that the code word (K) authorizes access to the compartment installation (830) or to one or more compartments (121, 122, 123) of the compartment installation (830) is that it is ascertained that the code word (K) was generated on the basis of at least information corresponding to the determined access information (Z).

Embodiment 5

Method according to Embodiment 4, wherein a further necessary condition for ascertaining that the code word (K) authorizes access to the compartment installation (830) or to one or more compartments (121, 122, 123) of the compartment installation (830) is that it is ascertained that the code word (K) was furthermore generated on the basis of a time value (T) which corresponds to a current time value of the compartment installation (830) or is in a predefined relation to the current time value of the compartment installation (830).

Embodiment 6

Method according to any of the preceding embodiments, furthermore comprising
Acquiring assignment information on the basis of which the key (S) is assignable to a user circle with a predefined function.

Embodiment 7

Method according to Embodiment 6, wherein the access information (Z) is generated in order to enable access to the compartment installation (830) for the user circle with said predefined function independently of a shipment (140), and wherein the indicator (I) is associated with the access information (Z) at least in such a way that the access information (Z) is uniquely assigned to a user circle with said predefined function and that the indicator (I) is associated with the user circle with said predefined function.

Embodiment 8

Method according to either of Embodiments 6-7, insofar as referring back to either of Embodiments 4-5, wherein a further necessary condition for ascertaining that the code word (K) authorizes access to the compartment installation (830) is that it is ascertained that the indicator (I) contained in the third data ($D_3$) is associated with a user circle with a predefined function.

Embodiment 9

Method according to any of the preceding embodiments, wherein a code word (K) for which it was ascertained that said code word authorizes access to the compartment installation (830) or to one or more compartments (121, 122, 123) of the compartment installation (830) does not authorize access anew or at least does not authorize access anew during a predefined time interval after this ascertaining.

Embodiment 10

Method, for example performed by a mobile apparatus (810), the method comprising
Generating or acquiring at least one key (S);
Communicating the key (S) to an apparatus (820) or to a system which is configured to communicate the key (S) to a compartment installation (830);
Acquiring second data ($D_2$), wherein the second data ($D_2$) comprise at least access information (C(Z;S)) encrypted with the key and an indicator (I);
Decrypting the access information (C(Z;S)) encrypted with the key;
Generating a code word (K) on the basis of at least the access information (Z); and
Communicating third data ($D_3$) to a compartment installation (830) or providing third data ($D_3$) for a compartment installation (830) in order to acquire access to the compartment installation (830) or to one or more compartments (121, 122, 123) of the compartment installation (830), wherein the third data ($D_3$) comprise at least the code word (K) and the indicator (I).

Embodiment 11

Method according to Embodiment 10, wherein the process of communicating the third data ($D_3$) to the compartment installation (830) or the process of providing the third data ($D_3$) for the compartment installation (830) is performed by means of one or more of the possibilities a)-d):
a) by means of a radio connection (131), in particular Bluetooth or NFC;
b) by means of an optical pattern which represents the third data ($D_3$) and which is displayed on a screen of the mobile apparatus (810) for capture by a capturing unit of the compartment installation (830);
c) by means of displaying the third data ($D_3$) on a screen of the mobile apparatus (810) for visual capture by a person (111), who then inputs the third data ($D_3$) on an input unit of the compartment installation (830), in particular a keyboard or a touch-sensitive screen; or
d) by means of an acoustic communication, for example by an apparatus (810) or person (111) reading aloud the third data ($D_3$) and the compartment installation (830) capturing them by means of speech recognition.

Embodiment 12

Method according to any of the preceding embodiments, wherein the indicator (I) contained in the third data ($D_3$) is represented by a first group of bits, wherein the code word (K) contained in the third data ($D_3$) is represented by a second group of bits, and wherein in the third data ($D_3$) the bits of the first group and the bits of the second group are mixed according to a predetermined rule.

Embodiment 13

Method according to any of the preceding embodiments, wherein the code word (K) is generated on the basis of at least access information (Z) and a time value (T).

Embodiment 14

Method according to any of the preceding embodiments, wherein the code word (K) is generated using a one-way function, in particular a hash function, wherein at least a portion of access information (Z) and at least a portion of a time value (T) are used as input data for the one-way function.

Embodiment 15

Method, for example performed by an apparatus (820) or a system (100), the method comprising
Acquiring, for example from a mobile apparatus (810), or generating a key (S);
Communicating the key (S) to a compartment installation (830);
Acquiring first data ($D_1$) from the compartment installation (830), wherein the first data ($D_1$) comprise at least access information (C(Z;S)) encrypted with the key and an indicator (I); and
Outputting second data ($D_2$), for example to the mobile apparatus (810), wherein the second data ($D_2$) comprise at least the access information (C(Z;S)) encrypted with the key and the indicator (I).

Embodiment 16

Method according to any of Embodiments 10-15, furthermore comprising one or more of the following method steps:

Acquiring or generating assignment information on the basis of which the key (S) is assignable to a user circle with a predefined function;

Communicating the assignment information to the compartment installation (830) or to an apparatus (820) or to a system which is configured to communicate the assignment information to the compartment installation (830).

Embodiment 17

Method according to Embodiment 16, furthermore comprising

Acquiring or generating association information before the key (S) and/or before the assignment information are/is communicated to the compartment installation (830), wherein the association information associates the key (S) with the compartment installation (830) to which the key (S) and/or the assignment information are/is communicated or are/is intended to be communicated.

Embodiment 18

Method according to any of the preceding embodiments, wherein the access information (Z) is generated by the compartment installation (830) in each case in the context of respective introducing, for example in reaction to the respective imminent, occurring or performed introducing, of at least one shipment (140) into a compartment (123) of the compartment installation (830).

Embodiment 19

Method according to any of the preceding embodiments, wherein the indicator (I) is or has been associated with the access information (Z) at least in such a way that the access information (Z) has been uniquely assigned to a compartment (121, 122, 123) of the compartment installation (830) and the indicator (I) is or has been associated with this compartment (121, 122, 123) of the compartment installation (830), wherein the compartment (121, 122, 123) is for example a compartment (121, 122, 123) into which a shipment (140) was introduced.

Embodiment 20

Method according to any of the preceding embodiments, wherein the key (S) is assigned to a user identifier, and wherein, when encrypting the access information (Z), the compartment installation (830) uses the key (S) assigned to said user identifier only if, in the context of respective introducing of a shipment (140) into a compartment (121, 122, 123) of the compartment installation (830), the latter was informed or it has ascertained that the shipment (140) is associated with said user identifier, wherein the shipment (140) is associated with the user identifier for example in such a way that the user identifier is the user identifier of a recipient (111) of the shipment (140).

Embodiment 21

Method according to any of the preceding embodiments, wherein the indicator (I) is an element from a first set, wherein the first set comprises more elements than a second set, wherein each element of the second set is assigned one-to-one to a respective compartment of the compartment installation (830), and wherein each element of the second set in whose one-to-one assigned compartment a shipment is situated is assigned one-to-one to an element of the first set.

Embodiment 22

Method according to Embodiment 21, insofar as referring back to Embodiment 20, wherein the user identifier originates from a third set comprising more elements than the first set.

Embodiment 23

Method according to any of the preceding embodiments, wherein the key (S) is a public key of an asymmetric key pair.

Embodiment 24

Apparatus (5, 6, 7) or system composed of at least two apparatuses (5, 6, 7), configured for performing and/or controlling the method according to any of Embodiments 1-23 or comprising respective means for performing and/or controlling the steps of the method according to any of Embodiments 1-23.

Embodiment 25

Computer program, comprising program instructions which cause a processor (50, 60, 70) to perform and/or control the method according to any of Embodiments 1-23 when the computer program runs on the processor (50, 60, 70).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by a compartment installation, the method comprising:
  acquiring, by at least one communication interface of the compartment installation, a key;
  generating, by a processor of the compartment installation, access information;
  encrypting, by the processor, the access information with the key;
  associating, by the processor, an indicator with the access information;
  outputting, by an output unit of the compartment installation or the at least one communication interface, first data, wherein the first data comprise at least the access information encrypted with the key and the indicator;
  acquiring, by an input unit of the compartment installation or the at least one communication interface, or capturing, by a capturing unit of the compartment installation, third data from an apparatus having a key for decrypting the encrypted access information, wherein the third data comprise a code word and an indicator;
  determining, by the processor, access information on the basis of at least the indicator contained in the third data;
  ascertaining, by the processor or by a lock control unit of the compartment installation, on the basis of at least the determined access information, whether the code word authorizes access to the compartment installation or to one or more compartments of the compartment installation; and
  granting, by the lock control unit, access to the compartment installation or to one or more compartments of the compartment installation, wherein a necessary condition for granting access is that it was ascertained that the code word authorizes access to the compartment installation or access to the one or more compartments of the compartment installation.

2. A method performed by a mobile apparatus, the method comprising:
  generating, by a processor of the mobile apparatus, or acquiring, by at least one communication interface of the mobile apparatus or by an input unit of the mobile apparatus, at least one key;
  communicating, by the at least one communication interface, the key to an apparatus or to a system which is configured to communicate the key to a compartment installation;
  acquiring, by the at least one communication interface, second data, wherein the second data comprise at least access information encrypted with the key and an indicator;
  decrypting, by the processor, the access information encrypted with the key;
  generating, by the processor, a code word on the basis of at least the access information; and
  communicating, by the at least one communication interface, third data to a compartment installation or providing, by a user interface of the mobile apparatus, third data for a compartment installation in order to acquire access to the compartment installation or to one or more compartments of the compartment installation, wherein the third data comprise at least the code word and the indicator.

3. A method performed by a system, the method comprising:
  acquiring by at least one communication interface of the system, from a mobile apparatus, a key, or generating, by a processor of the system, the key;
  communicating, by the at least one communication interface, the key to a compartment installation;
  acquiring, by the at least one communication interface, first data from the compartment installation, wherein the first data comprise at least access information encrypted with the key and an indicator; and
  outputting, by the at least one communication interface, second data, to the mobile apparatus, wherein the second data comprise at least the access information encrypted with the key and the indicator.

4. A compartment installation comprising at least one processor and at least one memory that includes program code, wherein the memory and the program code are configured to cause the compartment installation to perform the following:
  acquiring, by at least one communication interface of the compartment installation, a key;
  generating access information;
  encrypting the access information with the key;
  associating an indicator with the access information;
  outputting, by an output unit of the compartment installation or the at least one communication interface, first data, wherein the first data comprise at least the access information encrypted with the key and the indicator;
  acquiring, by an input unit of the compartment installation or the at least one communication interface, or capturing, by a capturing unit of the compartment installation, third data from an apparatus having a key for decrypting the encrypted access information, wherein the third data comprise a code word and an indicator;
  determining access information on the basis of at least the indicator contained in the third data;
  ascertaining on the basis of at least the determined access information, whether the code word authorizes access to the compartment installation or to one or more compartments of the compartment installation; and
  granting, by a lock control unit of the compartment installation, access to the compartment installation or to one or more compartments of the compartment installation, wherein a necessary condition for granting access is that it was ascertained that the code word authorizes access to the compartment installation or access to the one or more compartments of the compartment installation.

5. The compartment installation according to claim 4, wherein first data are output to an apparatus or to a system which is configured to communicate data to the apparatus having a key for decrypting the encrypted access information.

6. The compartment installation according to claim 4, wherein the code word only authorizes access to compartments of the compartment installation in which respective shipments associated with an identical user identifier are situated, wherein the memory and the program code are further configured to cause the compartment installation to perform:
  determining a compartment with which the indicator contained in the third data is associated;

determining the user identifier on the basis of information concerning a shipment situated in the determined compartment, wherein the user identifier is for example the user identifier of a recipient of the shipment;

determining one or more further compartments in which respective shipments associated with the determined user identifier are situated.

7. The compartment installation according to claim 4, wherein the memory and the program code are further configured to cause the compartment installation to perform:
storing the generated access information;
storing the indicator associated with the access information; wherein in the determining of the access information on the basis of at least the indicator contained in the third data comprises the stored access information is determined, and wherein a necessary condition for ascertaining that the code word authorizes access to the compartment installation or to one or more compartments of the compartment installation is that it is ascertained that the code word was generated using a one-way function, wherein at least a portion of the determined access information and at least a portion of a time value which corresponds to a current time value of the compartment installation or is in a predefined relation to the current time value of the compartment installation were used as input data for the one-way function.

8. The compartment installation according to claim 4, wherein the memory and the program code are further configured to cause the compartment installation to perform:
Acquiring, by the at least one communication interface, assignment information on the basis of which the key is assignable to a user circle with a predefined function.

9. The compartment installation according to claim 8, wherein the access information is generated in order to enable access to the compartment installation for the user circle with said predefined function independently of a shipment, and wherein the indicator is associated with the access information at least in such a way that the access information is uniquely assigned to a user circle with said predefined function and that the indicator is associated with the user circle with said predefined function.

10. The compartment installation according to claim 8, wherein a necessary condition for ascertaining that the code word authorizes access to the compartment installation or to one or more compartments of the compartment installation is that it is ascertained that the code word was generated on the basis of at least information corresponding to the determined access information, and wherein a further necessary condition for ascertaining that the code word authorizes access to the compartment installation is that it is ascertained that the indicator contained in the third data is associated with a user circle with a predefined function.

11. The compartment installation according to claim 4, wherein a code word for which it was ascertained that said code word authorizes access to the compartment installation or to one or more compartments of the compartment installation does not authorize access anew or at least does not authorize access anew during a predefined time interval after this ascertaining.

12. The compartment installation according to claim 4, wherein the access information is generated by the compartment installation in each case in the context of respective introducing, for example in reaction to the respective imminent, occurring or performed introducing, of at least one shipment into a compartment of the compartment installation.

13. The compartment installation according to claim 4, wherein the indicator is or has been associated with the access information at least in such a way that the access information has been uniquely assigned to a compartment of the compartment installation and the indicator is or has been associated with this compartment of the compartment installation, wherein the compartment is for example a compartment into which a shipment was introduced.

14. The compartment installation according to claim 4, wherein the key is assigned to a user identifier, and wherein, when encrypting the access information, the compartment installation uses the key assigned to said user identifier only if, in the context of respective introducing of a shipment into a compartment of the compartment installation, the latter was informed or it has ascertained that the shipment is associated with said user identifier, wherein the shipment is associated with the user identifier for example in such a way that the user identifier is the user identifier of a recipient of the shipment.

15. The compartment installation according to claim 4, wherein the indicator is an element from a first set, wherein the first set comprises more elements than a second set, wherein each element of the second set is assigned one-to-one to a respective compartment of the compartment installation, and wherein each element of the second set in whose one-to-one assigned compartment a shipment is situated is assigned one-to-one to an element of the first set.

16. The compartment installation according to claim 15, wherein the key is assigned to a user identifier, and wherein, when encrypting the access information, the compartment installation uses the key assigned to said user identifier only if, in the context of respective introducing of a shipment into a compartment of the compartment installation, the latter was informed or it has ascertained that the shipment is associated with said user identifier, wherein the shipment is associated with the user identifier for example in such a way that the user identifier is the user identifier of a recipient of the shipment, and wherein the user identifier originates from a third set comprising more elements than the first set.

17. A mobile apparatus, comprising at least one processor and at least one memory that includes program code, wherein the memory and the program code are configured to cause the mobile apparatus to perform the following:
generating or acquiring, by at least one communication interface of the mobile apparatus or an input unit of the mobile apparatus, at least one key;
communicating, by the at least one communication interface, the key to an apparatus or to a system which is configured to communicate the key to a compartment installation;
acquiring, by the at least one communication interface, second data, wherein the second data comprise at least access information encrypted with the key and an indicator;
decrypting the access information encrypted with the key;
generating a code word on the basis of at least the access information; and
communicating, by the at least one communication interface, third data to a compartment installation or providing, by a user interface of the mobile apparatus, third data for a compartment installation in order to acquire access to the compartment installation or to one or more compartments of the compartment installation, wherein the third data comprise at least the code word and the indicator.

18. The mobile apparatus according to claim 17, wherein the process of communicating the third data to the compartment installation or the process of providing the third data for the compartment installation is performed by means of one or more of the possibilities a)-d):
  a) by means of a radio connection, in particular Bluetooth or NFC;
  b) by means of an optical pattern which represents the third data and which is displayed on a screen of the mobile apparatus for capture by a capturing unit of the compartment installation;
  c) by means of displaying the third data on a screen of the mobile apparatus for visual capture by a person, who then inputs the third data on an input unit of the compartment installation, in particular a keyboard or a touch-sensitive screen; or
  d) by means of an acoustic communication, for example by an apparatus or person reading aloud the third data and the compartment installation capturing them by means of speech recognition.

19. The mobile apparatus according to claim 17, wherein the indicator contained in the third data is represented by a first group of bits, wherein the code word contained in the third data is represented by a second group of bits, and wherein in the third data the bits of the first group and the bits of the second group are mixed according to a predetermined rule.

20. The mobile apparatus according to claim 17, wherein the code word is generated on the basis of at least access information and a time value.

21. The mobile apparatus according to claim 17, wherein the code word is generated using a one-way function, wherein at least a portion of the access information and at least a portion of a time value are used as input data for the one-way function.

* * * * *